(12) United States Patent
Bair

(10) Patent No.: US 9,975,591 B2
(45) Date of Patent: May 22, 2018

(54) APPARATUS, SYSTEM, AND METHOD FOR REMOVING AND INSTALLING A CONTINUOUS TRACK ON A MACHINE

(71) Applicant: Bair Products, Inc., Louisburg, KS (US)

(72) Inventor: Larry Bair, Louisburg, KS (US)

(73) Assignee: Bair Products, Inc., Louisburg, KS (US)

(*) Notice: Subject to any disclaimer, the term of this patent is extended or adjusted under 35 U.S.C. 154(b) by 55 days.

(21) Appl. No.: 15/043,019

(22) Filed: Feb. 12, 2016

(65) Prior Publication Data

US 2016/0194040 A1 Jul. 7, 2016

Related U.S. Application Data

(63) Continuation of application No. 13/794,131, filed on Mar. 11, 2013, now Pat. No. 9,260,146.

(60) Provisional application No. 61/679,881, filed on Aug. 6, 2012.

(51) Int. Cl.
*B62D 55/32* (2006.01)
*B23P 6/00* (2006.01)

(52) U.S. Cl.
CPC .............. *B62D 55/32* (2013.01); *B23P 6/00* (2013.01); *B23P 2700/50* (2013.01); *Y10T 29/53448* (2015.01)

(58) Field of Classification Search
CPC ........ B62D 55/32; B62D 55/30; B62D 55/08; B23P 19/10; B23P 21/002; B23P 2700/50; B23P 6/00
See application file for complete search history.

(56) References Cited

U.S. PATENT DOCUMENTS

2005/0252592 A1* 11/2005 Albright ................ B62D 55/12
152/379.3

* cited by examiner

*Primary Examiner* — Christopher Besler
(74) *Attorney, Agent, or Firm* — Erise IP, P.A.

(57) ABSTRACT

A system for installing a continuous track on a wheel assembly of a heavy-equipment machine, broadly including an extension assembly with proximal and distal ends; a base assembly removeably connected to the wheel assembly, which functions to provide foundational support for the remaining components of the system; a support assembly for maintaining a portion of the extension assembly properly in position during installation of the continuous track, and an installation bracket assembly attached to the distal end of the extension assembly.

18 Claims, 24 Drawing Sheets

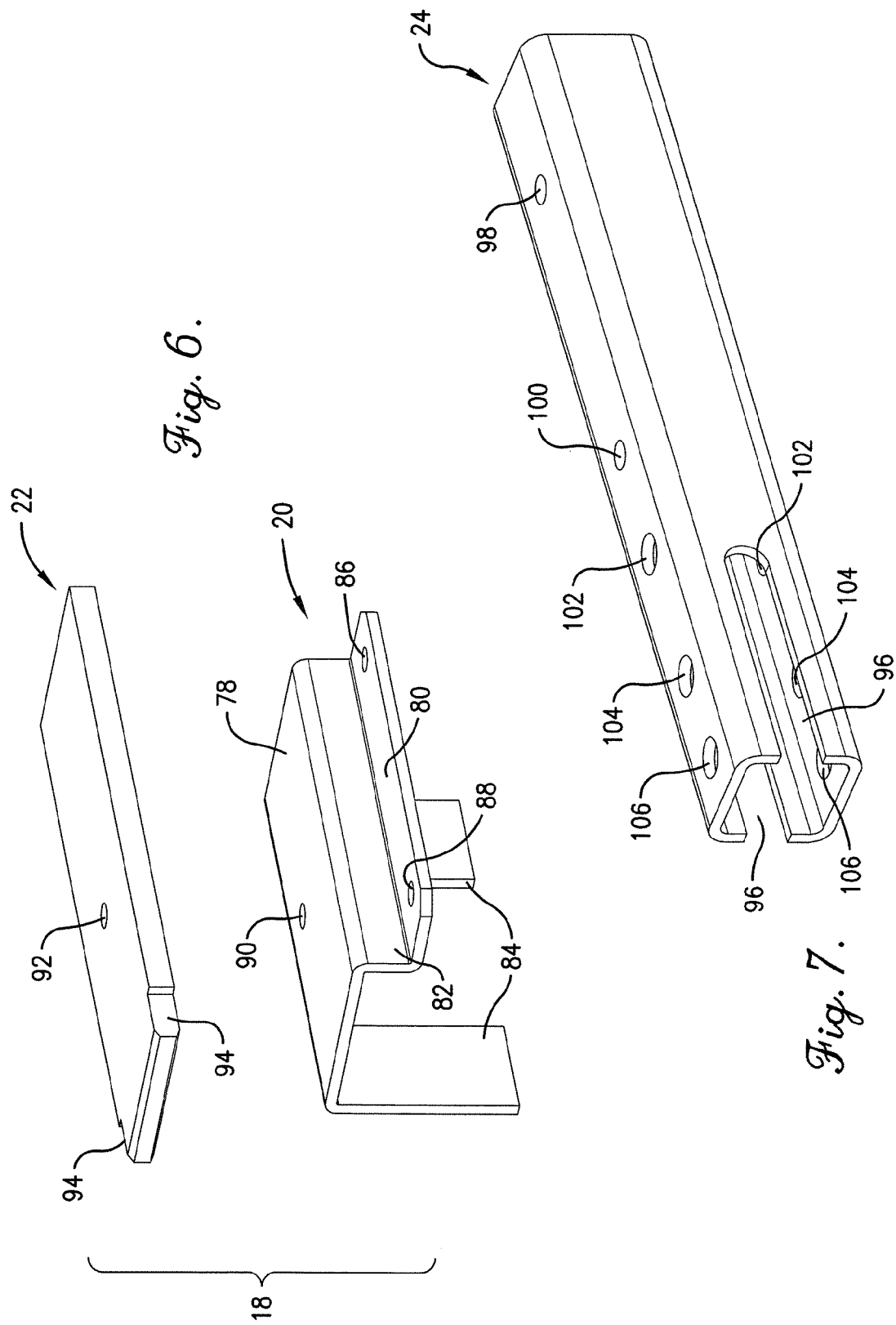

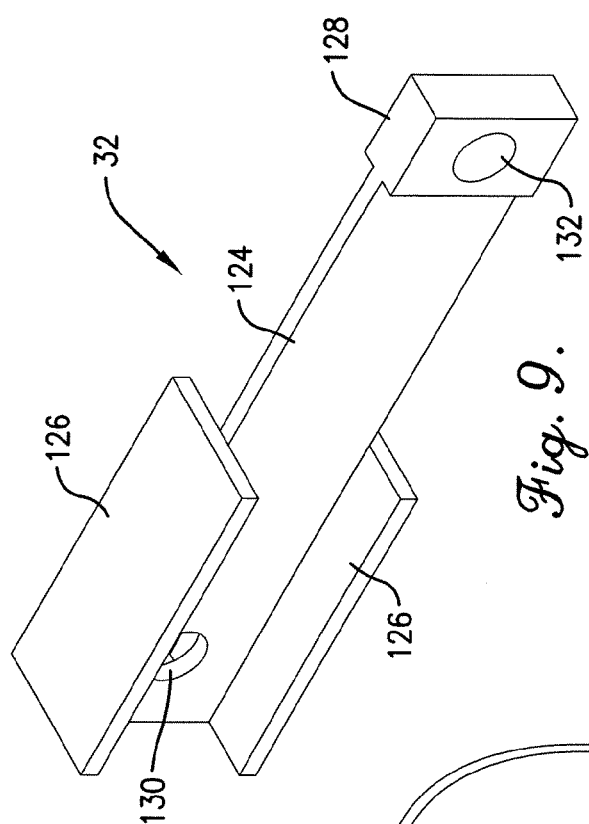
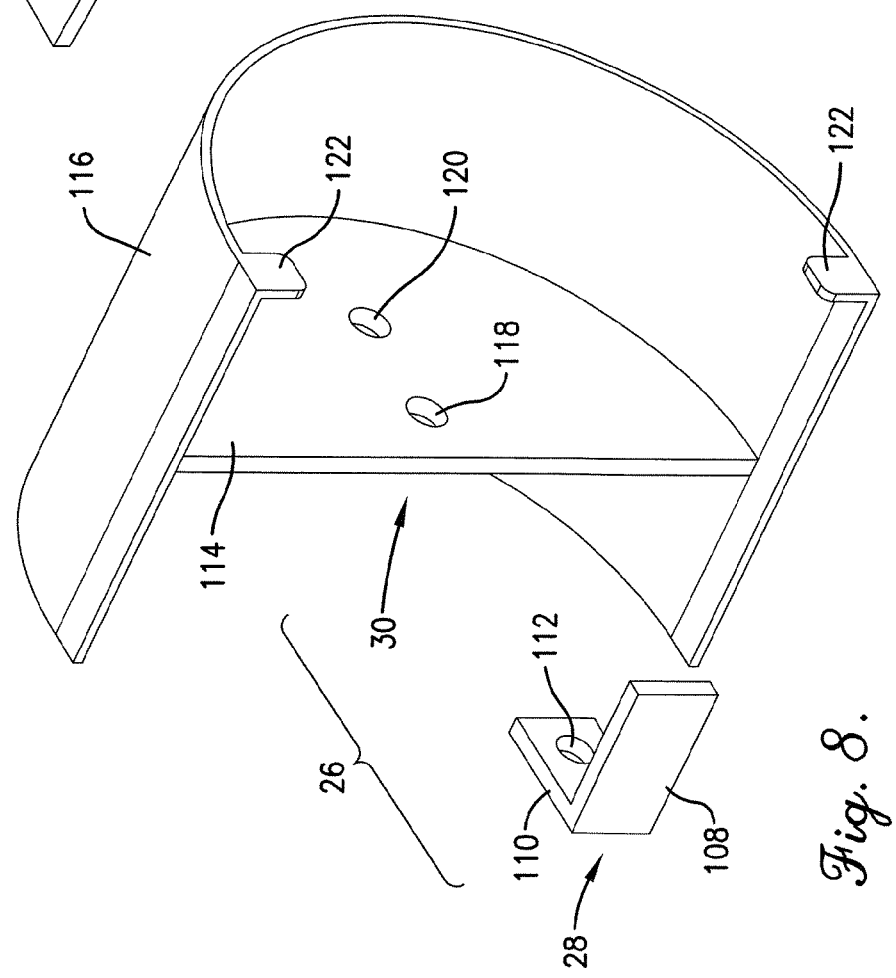

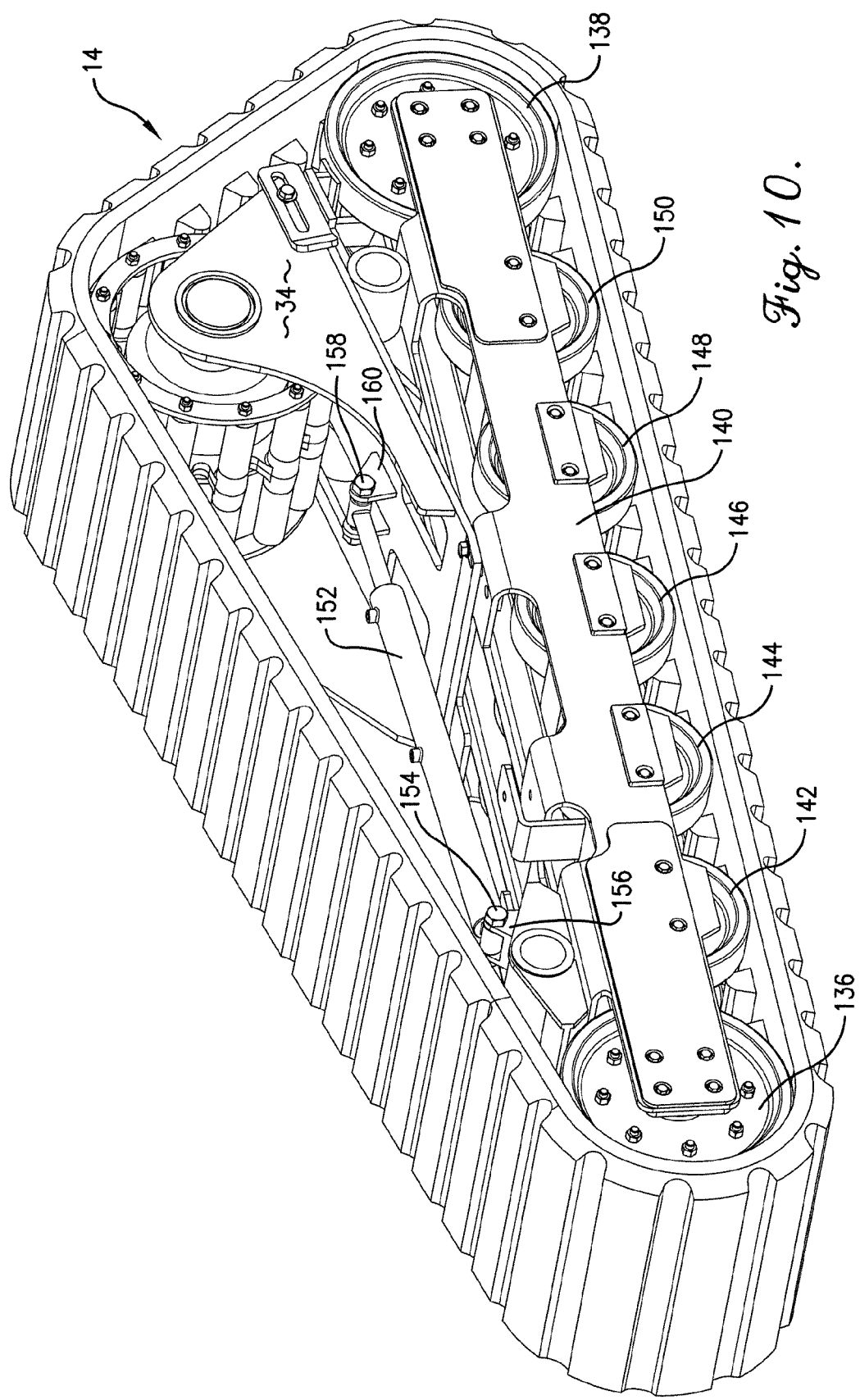

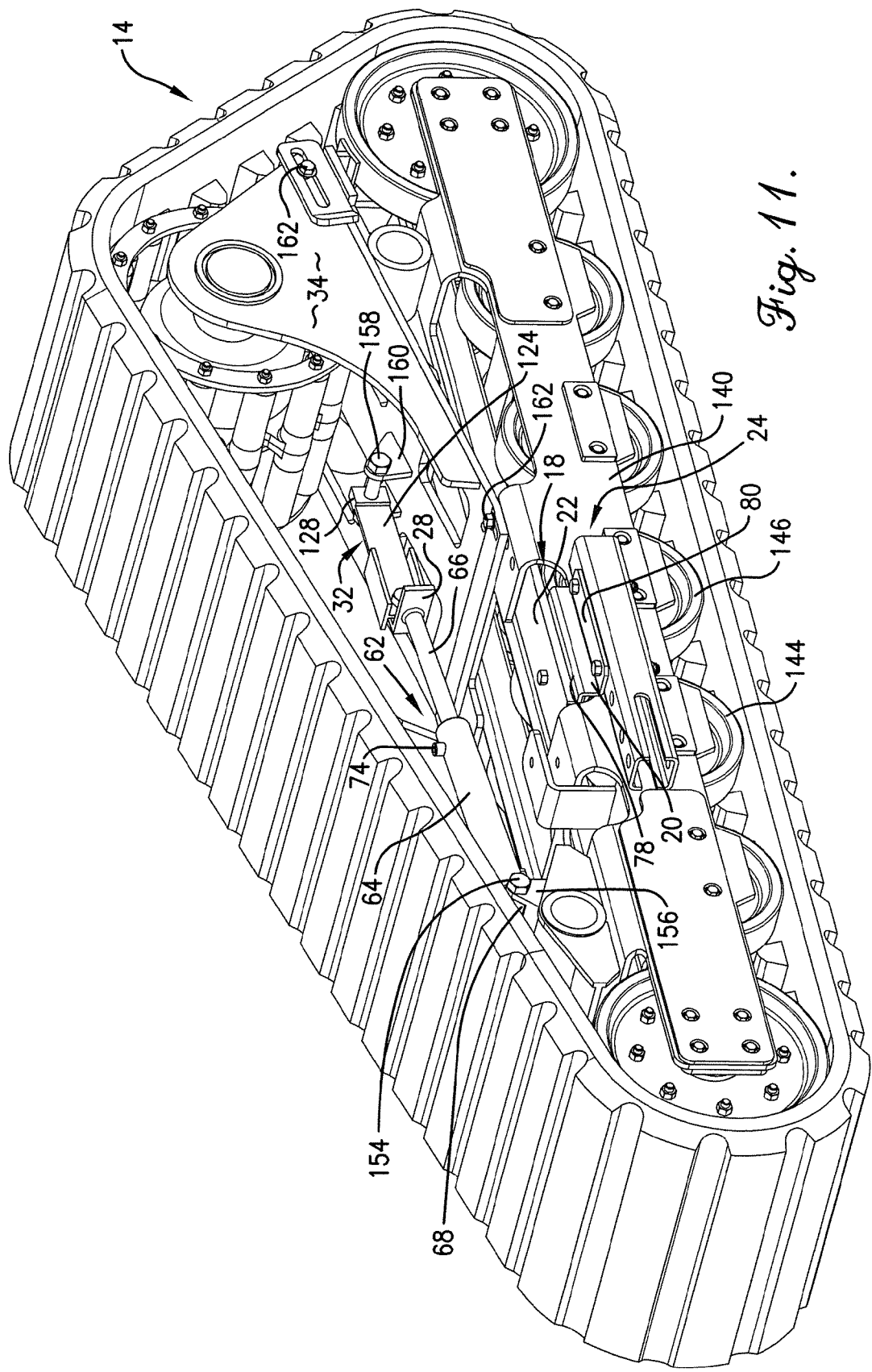

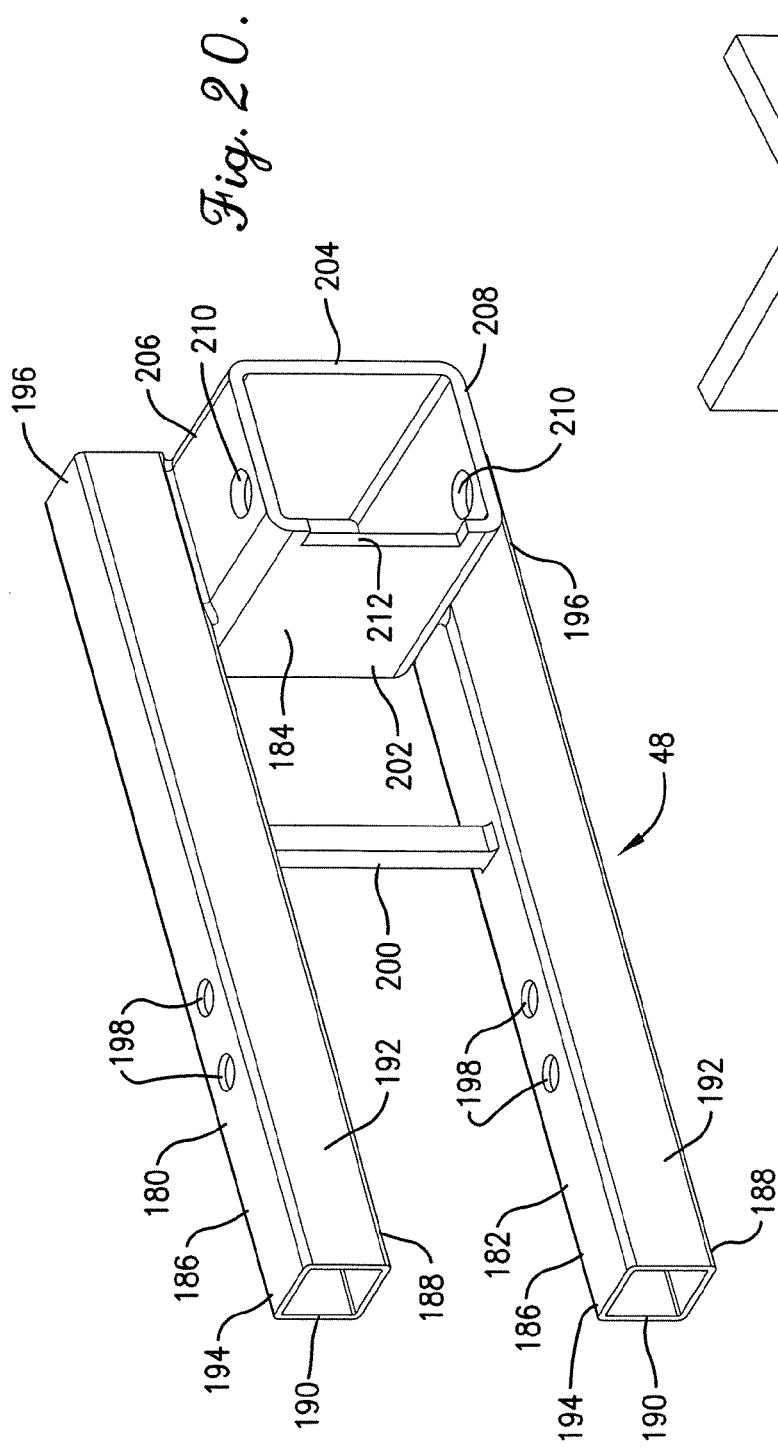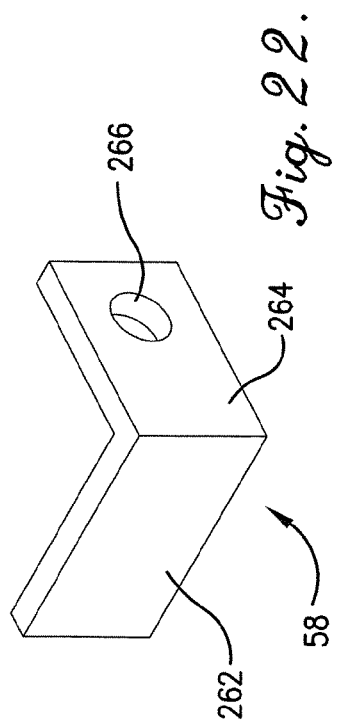

APPARATUS, SYSTEM, AND METHOD FOR REMOVING AND INSTALLING A CONTINUOUS TRACK ON A MACHINE

RELATED APPLICATION

This non-provisional patent application is a continuation application and claims priority benefit with regard to all common subject matter of earlier-filed U.S. patent application Ser. No. 13/794,131, filed on Mar. 11, 2013, and entitled "APPARATUS, SYSTEM, AND METHOD FOR REMOVING AND INSTALLING A CONTINUOUS TRACK ON A MACHINE," which is now U.S. Pat. No. 9,260,146 issued on Feb. 16, 2016 ("the '146 patent"). The '146 patent is hereby incorporated by reference in its entirety.

This non-provisional continuation application and the '146 patent claim priority benefit, with regard to all common subject matter, of earlier filed U.S. Provisional Patent Application No. 61/679,881, filed Aug. 6, 2012, and entitled "APPARATUS AND METHOD FOR REMOVING AND INSTALLING A CONTINUOUS TRACK ON A MACHINE." The identified earlier-filed provisional patent application is hereby incorporated by reference in its entirety into the present non-provisional application.

FIELD

The present invention is directed to an apparatus, a system, and a method for removing and/or installing a continuous track on a machine. In more detail, the present invention includes an apparatus, a system, and a method used to remove and/or install continuous-loop, rubber tracks on variously designed wheel assemblies for heavy-equipment machines, such as may be used in construction and earth-moving operations

BACKGROUND

Heavy-equipment machines often include continuous-loop, rubber tracks that provide propulsion for the machines. The continuous tracks are generally mounted on and driven by a plurality of wheels attached to wheel assemblies of the machines. Because the machines are often large in size and weight, the continuous tracks must be correspondingly high in strength and durability. The strength and durability of the continuous tracks often makes them inflexible and unwieldy. Thus, installing a new continuous track on a heavy-equipment machine generally requires a plurality of workers to each expend several hours to remove an old continuous track and to maneuver and properly align the new continuous track onto a wheel assembly of the machine. Such labor intensive work is physically demanding and time consuming. Apart from the monetary expenses (i.e., the man-hours) involved with installing and/or removing continuous tracks, most current methods for installing and/or removing continuous tracks also lead to workplace injuries. For instance, such methods generally involve only the use of simple tools (e.g., pry bars) and brute-force. Because of the weight of the components of the heavy-equipment machines and the forces required to be applied to the components by the workers, the workers may often be injured by accidents or overexertion.

SUMMARY

Embodiments of the present invention include a track installation system for installing a continuous track on a wheel assembly of a heavy-equipment machine. The system for installing the continuous track on the wheel assembly broadly includes a base assembly removeably connected to the wheel assembly and operable to provide foundational support for the track installation system; an installation bracket assembly, wherein the installation bracket assembly is operable to interface with a portion of the continuous track or a portion of a wheel of the wheel assembly during installation of the continuous track; an extension assembly having proximal and distal ends, with the installation bracket assembly attached to the distal end of the extension assembly, with the extension assembly being operable to extend the continuous track or the wheel of the wheel assembly into proper alignment with the wheel assembly; and a support assembly removeably attached to the wheel assembly and operable for maintaining a portion of the extension assembly in place during installation of the continuous track.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is an exploded view of a first base assembly of the first system shown in FIG. 2, with the first base assembly including a saddle and a lockplate;

FIG. 7 is a perspective view of a first support assembly of the first system shown in FIG. 2;

FIG. 8 is an exploded view of a first support assembly of the first system shown in FIG. 2, with the first support assembly including an L-shaped bracket and a track interface bracket;

FIG. 9 is a perspective view of a push-pull bar of the first system shown in FIG. 2;

FIG. 10 is a distal perspective view of the first wheel assembly shown in FIG. 1;

FIG. 11 is a distal perspective view of the first wheel assembly shown in FIGS. 1 and 10, with the extension assembly from FIG. 5 and the push-pull bar from FIG. 9 attached to the first wheel assembly for disengagement of a drive support assembly;

FIG. 20 is a perspective view of a second base assembly of the second system shown in FIG. 4;

FIG. 22 is a perspective view of a second installation bracket assembly of the second system shown in FIG. 4, including an L-shaped bracket;

Figure 1:
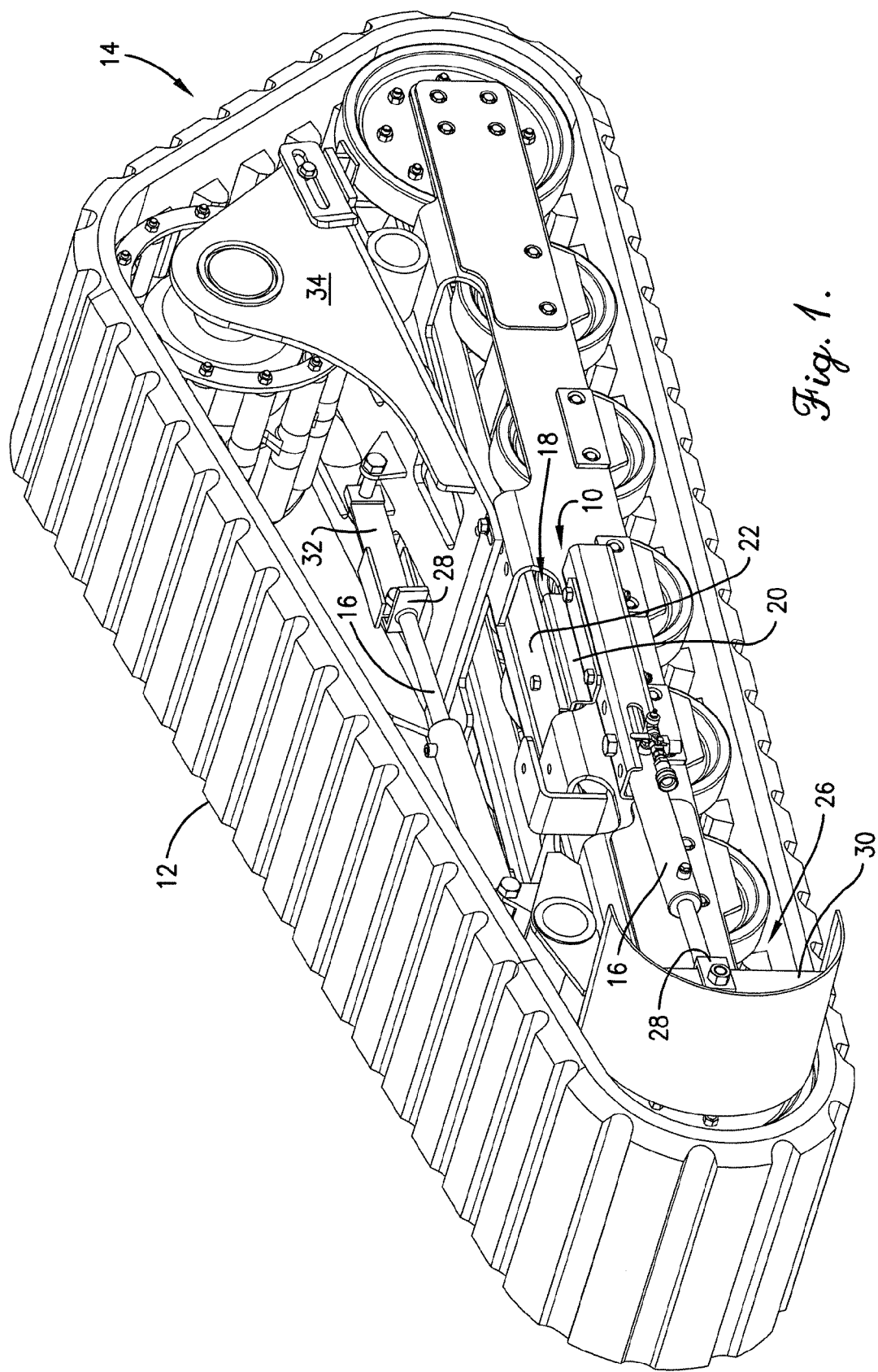
FIG. 1 is a distal perspective view of a first system constructed according to embodiments of the present invention and attached to a first wheel assembly of a first heavy-equipment machine.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
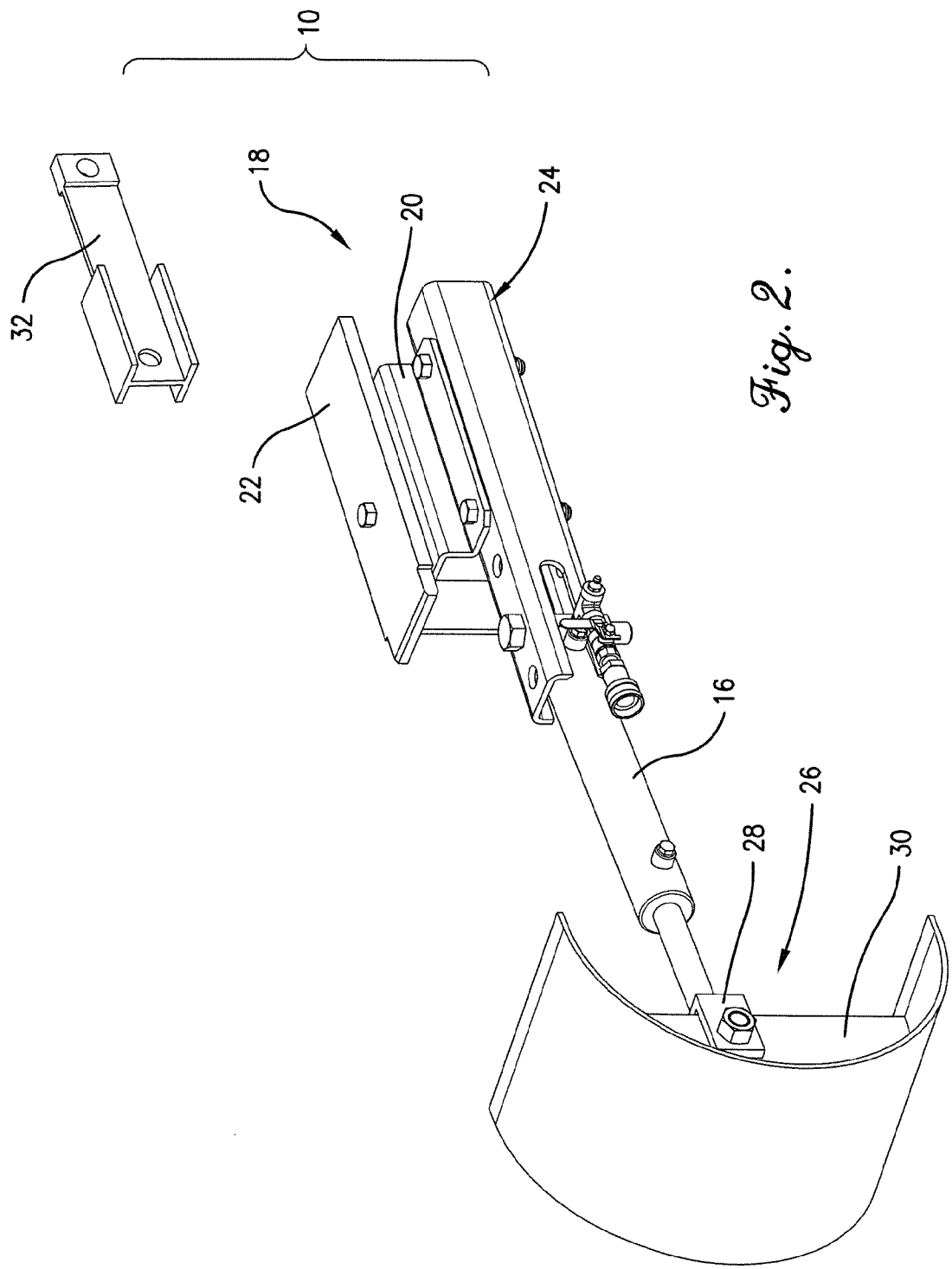
FIG. 2 is an exploded view of the first system shown in FIG. 1.

Embodiments of the present invention provide an apparatus, a system, and a method for removing and/or installing a continuous track on a wheel assembly of a heavy-equipment machine. As used throughout, distal refers to a direction towards a front end of a wheel assembly of a heavy-equipment machine (i.e., left-hand side of FIGS. 1 and 3), while proximal refers to a direction towards a rear end of a wheel assembly of a heavy-equipment machine (i.e., right-hand side of FIGS. 1 and 3). The system of embodiments of the present invention broadly comprises an extension assembly with proximal and distal ends; a base assembly removeably connected to the heavy-equipment machine, so as to provide foundational support for the system; a support assembly for maintaining at least a portion of the extension assembly in place during installation of the continuous track; and an installation bracket assembly connected to the distal end of the extension assembly for guiding the continuous track or a component of the wheel assembly of the heavy-equipment machine in place during installation of the continuous track. The system may include a plurality of embodiments, such that the system functions to remove and/or install continuous tracks on a plurality of types wheel assemblies for various types of heavy-equipment machines. For example, turning to the figures, a first system 10 of embodiments of the present invention for installing a continuous track 12 on a first wheel assembly 14 of a first heavy-equipment machine is illustrated in FIG. 1. With reference to FIGS. 1-2, the first system 10 broadly comprises a first extension assembly 16 with proximal and distal ends; a first base assembly 18 including a saddle 20 and a lock plate 22, with the first base assembly removeably attached to the first wheel assembly; a first support assembly 22 connected to the first base assembly, with the first support assembly further connected to a portion of the proximal end of the first extension assembly; and a first installation bracket assembly 26 including an L-shaped bracket 28 and a track interface bracket 30, with the L-shaped bracket configured to be attached to both the distal end of the first extension assembly and the track installation bracket. After the components of the first system 10 are combined and attached to the first wheel assembly 14, the system can be used to install a continuous track 12 on the first wheel assembly of the first heavy-equipment machine. In more detail, by placing a proximal section of the continuous track 12 over a proximal portion of the first wheel assembly 14 of the first heavy-equipment machine, and by further placing a distal portion of the continuous track over the track installation bracket 30 of the system 10, the first extension assembly 16 can be extended, thus causing the track installation bracket to interface with the continuous track and extending the continuous track until the distal portion of the continuous track is aligned with a distal end of the first wheel assembly of the first heavy-equipment machine. Once aligned, the distal portion of the continuous track 12 can be positioned onto the distal end of the first wheel assembly 14, such that the continuous track is completely installed on the first wheel assembly. In additional embodiments and with reference to FIGS. 1-2, the first system 10 may include a push-pull bar 32 that may be used in conjunction with the first extension assembly 16 to assist in disengaging and re-engaging a drive support assembly 34 from the first wheel assembly 14 of the first heavy equipment machine.

Figure 3:
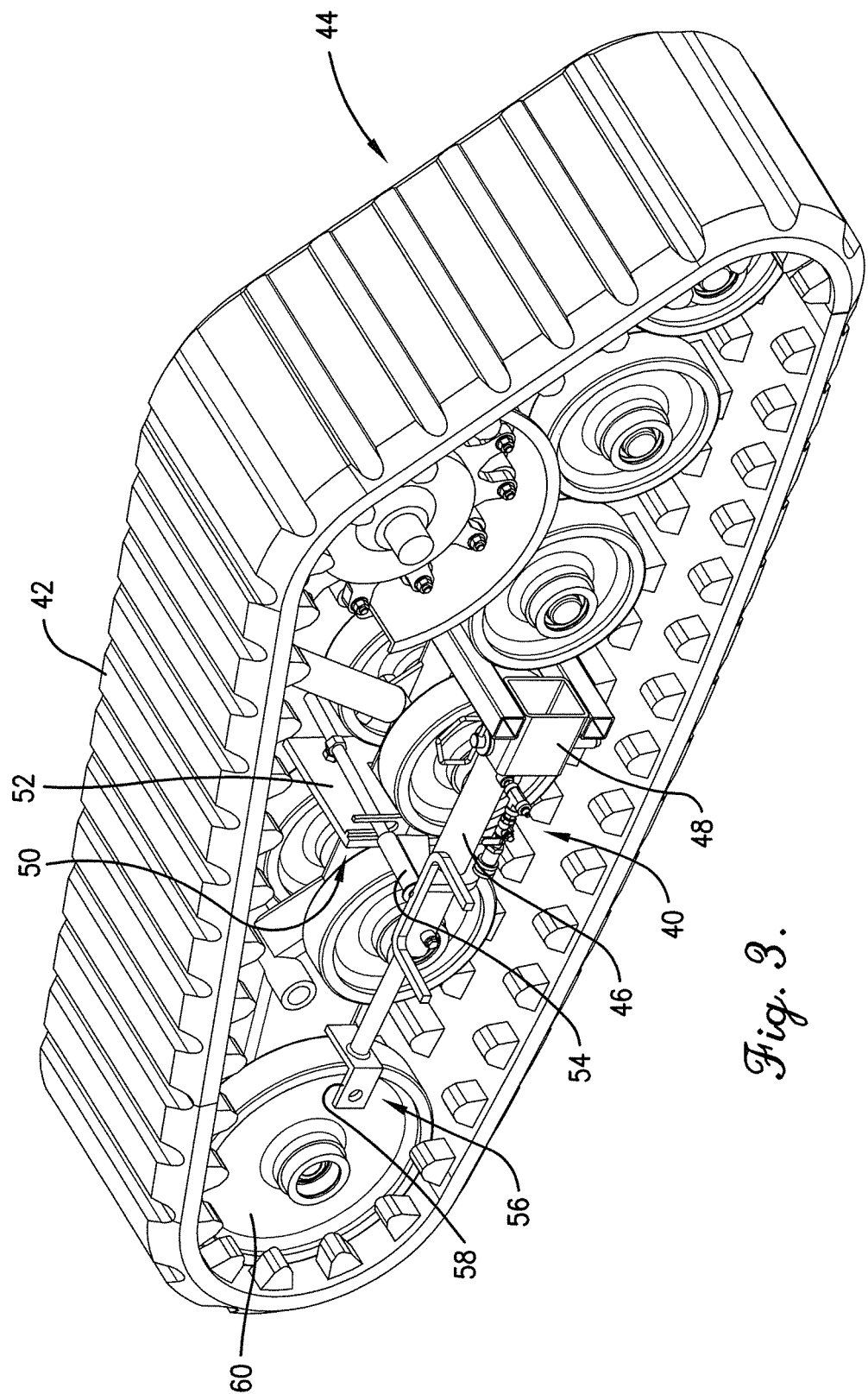
FIG. 3 is a proximal perspective view of a second system constructed according to embodiments of the present invention and attached to a second wheel assembly of a second heavy-equipment machine.
Figure 4:
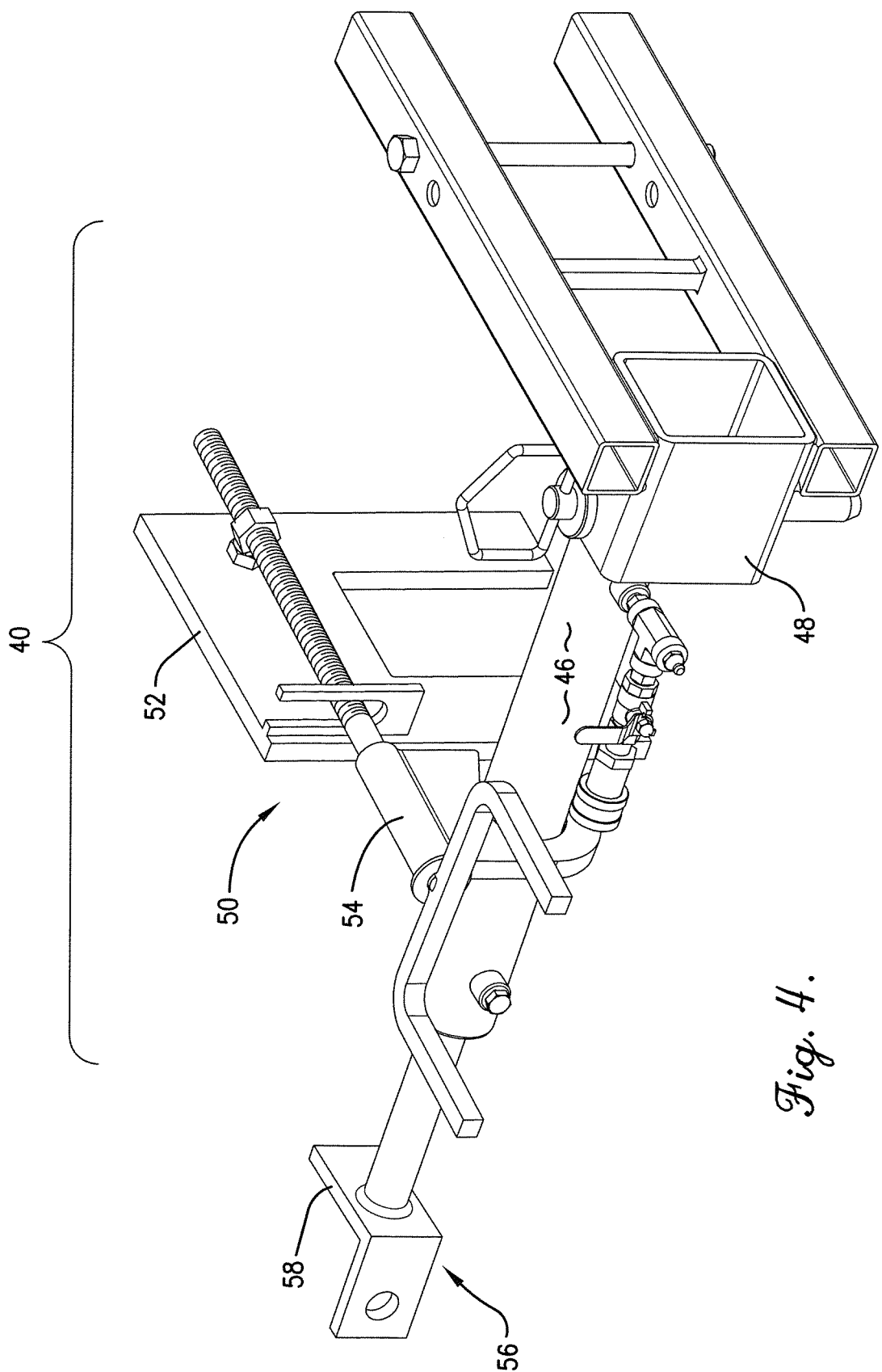
FIG. 4 is a perspective view of the second system shown in FIG. 3.

As an additional exemplary embodiment, a second system 40 of embodiments of the present invention for installing a continuous track 42 on a second wheel assembly 44 of a second heavy-equipment machine is illustrated in FIG. 3. With reference to FIGS. 3-4, the second system 40 broadly comprises a second extension assembly 46, which may be similar in all respects to the first extension assembly 16, including proximal and distal ends; a second base assembly 48 removeably connected to the second wheel assembly of the second heavy-equipment machine; a second support assembly 50 including a U-shaped saddle 52 removeably attached to the second wheel assembly of the second heavy-equipment machine; a jack-screw assembly 54 attached to the U-shaped saddle and providing support for the second extension assembly; and a second installation bracket assembly 56 comprising an L-shaped bracket 58, which may be similar in all respects to the L-shaped bracket 28 from first system 10, and configured to be attached to the distal end of the second extension assembly 46. After the components of the second system 40 are connected as discussed above, the system can be used to install the continuous track 42 on the second wheel assembly 44 of the second heavy-equipment machine. By placing the second continuous track 42 over the second wheel assembly 44 of the second heavy equipment machine, and by further positioning the L-shaped bracket 58 against a circumferential edge of a front exterior idler wheel 60 of the second wheel assembly, the second extension assembly 46 can be extended, thus forcing the idler wheel 60 forward and extending the continuous track 42 until the idler wheel is aligned with an axel shaft of the second wheel assembly 44. Once aligned, the idler wheel 60 can be secured to the second wheel assembly 44, such that the continuous track 42 is completely installed on the machine.

Thus, as can be appreciated, the present invention includes multiple embodiments of an apparatus, a system, and a method for removing and/or installing a continuous track on various types of wheel assemblies associated with various types of heavy-equipment machines. One or more of the multiple embodiments may be implemented to remove and/or install a continuous track on a different type of wheel assembly of a heavy-equipment machine. The following descriptions are provided with reference to embodiments of the present invention for use on two specific types of wheel assemblies of heavy-equipment machines. For instance, the following descriptions are directed to wheel assemblies similar to first and second wheel assemblies 14, 44, as illustrated in FIGS. 1 and 3, respectively. However, it is understood that embodiments of the present invention may be implemented on various types of wheel assemblies associated with various types of heavy-equipment machines. Thus, the following descriptions are not intended to be limiting.

Returning to the first system 10 of embodiments of the present invention, best illustrated in FIGS. 1-2, the first system broadly comprises the first extension assembly 16 with proximal and distal ends; the first base assembly 18 including the saddle 20 and the lock plate 22, with the first base assembly attached to the first wheel assembly 14; the first support assembly 24 connected to the first base assembly, with the first support assembly further connected to the portion of the proximal end of the first extension assembly; and the first installation bracket assembly 26 including the L-shaped bracket 28 and the track interface bracket 30, with the L-shaped bracket attached to the distal end of the first extension assembly and the track installation bracket attached to the L-shaped bracket. In additional embodiments, the first system 10 may include the push-pull bar 32 that may be used to assist in disengaging and reengaging the drive support assembly 34 from the first wheel assembly 14 of the first heavy-equipment machine. The first system 10 is generally used with wheel assemblies on heavy-equipment machines that include at least three or more front idler wheels and at least three interior/exterior bogie wheels. When the first system 10 is removeably secured to the first wheel assembly 14, the components of the system operate to efficiently install a new continuous track onto the wheel assembly. In additional embodiments, as discussed in more detail below, embodiments of the present invention may also be used to disengage and reengage the drive support assembly 34, so as to assist in removing an old continuous track and installing the new continuous track.

Figure 5:
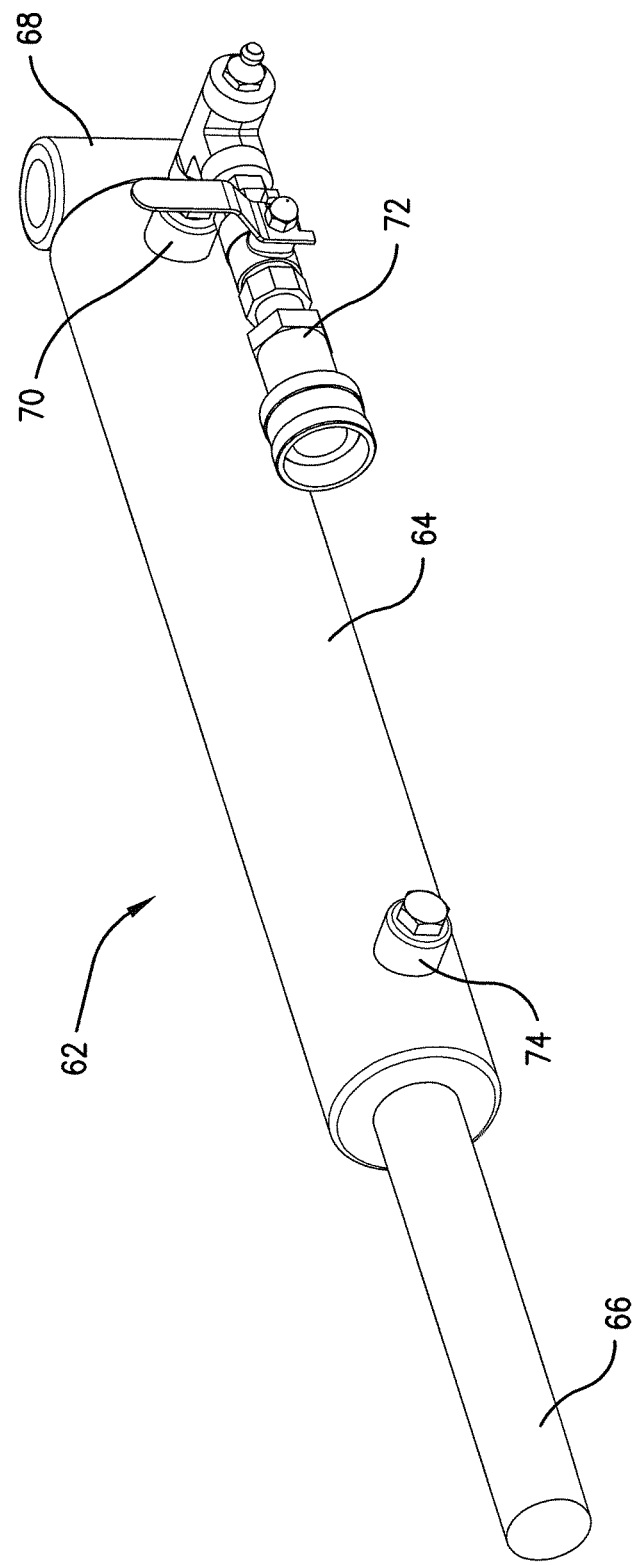
FIG. 5 is a perspective view of an extension assembly included in the first system of FIG. 2 and the second system of FIG. 4.

The first extension assembly 16 may include any assembly or device capable of performing lifting or extension-type operations, such as a mechanical lifting device (i.e., a jack-screw, farm jack, or the like), a pneumatically-actuated lifting device, a hydraulically-actuated lifting device, an electrically-actuated lifting device, or the like. In embodiments where the extension assembly 16 comprises a hydraulically-actuated lifting device, the extension assembly may include a hydraulic cylinder 62, such as illustrated in FIG. 5. The hydraulic cylinder 62 may broadly comprise a hollowed barrel 64; a piston rod 66 free to actuate within the hollowed barrel; and a short pipe 68 attached to a proximal end of the hollowed barrel. The hollowed barrel 64 and the piston rod 66 work together like a hydraulic cylinder known in the art. For instance, the hollowed barrel 64 may include a first grease nipple 70 attached to its outer surface near its proximal end. A grease gun (not shown) can be attached to the first grease nipple 70, via a valve assembly 72, and can force grease into an opening of the first grease nipple, through a wall of the hollowed barrel 64, and to an interior volume of the proximal end of the hollowed barrel. The grease provides pressure against the piston rod 66, causing the piston rod to actuate and extend distally out of the hollowed barrel 64 (i.e., to "stroke" or "stroke out"). To retract the rod (i.e., to "de-stroke"), a valve in the first grease nipple 70 may be opened (e.g., via valve assembly 72). The grease may then purge out of the hollowed barrel 64, allowing for the piston rod 66 to retract back inside the hollowed barrel. In further embodiments, the hydraulic cylinder 62 may include a second grease nipple 74 adjacent to the distal end of the hollowed barrel 64. The grease gun may be attached to the second grease nipple 74 to force grease into a void in the distal end of the hollowed barrel 64, thus causing the piston rod 66 to de-stroke. In additional embodiments of the present invention, other types of hydraulic pressure applicators may be used, such as portable hydraulic pumps (e.g., a portable power pump) or the like. The valve assembly 72 may include quick release attachment/detachment mechanisms, such that hydraulic pressure applicators can quickly connect and de-connect from the hydraulic cylinder 62. In embodiments in which other extension assembly are used, additional sources of pressure (e.g., air pumps, electrical power sources, etc.) may be applied to the first extension assembly, such as to provide the power to cause the extension assembly to extend and retract.

The hollowed barrel 64 may be made of steel, iron, or any other metal suitable for heavy-duty applications. The piston rod 66 may be formed from a solid piece of chrome plated steel, iron, or other metal suitable for heavy duty applications. In a retracted position, the piston rod 66 may be positioned entirely within the hollowed barrel 64. The hydraulic cylinder's short pipe 68 is made from steel, iron, or other metal suitable for heavy duty applications. The short pipe 68 is positioned on the proximal end of the hollowed barrel 64 and is positioned such that a longitudinal axis of the short pipe is generally perpendicular to a longitudinal axis of the hollowed barrel. The short pipe 68 may be attached to the hollowed barrel 64 by welding an exterior surface of the short pipe to the distal end of the hollowed barrel.

With reference to FIG. 6, the first base assembly 18 broadly includes the saddle 20 and a lock plate 22 that attaches to an upper surface of the saddle. In certain embodiments, the first base assembly 18 may be positioned between the second and third bogie wheel of the first wheel assembly 14 of the first heavy-equipment machine and functions to provide foundational support for the first extension assembly 16 during operation of the first extension assembly to install a new continuous track onto the first wheel assembly.

The saddle 20 may generally include a rectangular main plate 78, a rectangular lip 80 positioned on an exterior side of the main plate, with the main plate and the lip opposed by a rectangular connecting section 82, and two rectangular overhang sections 84 connected to an interior edge of the main plate. The saddle 20 may be made from steel, iron, or other metal suitable for heavy duty operation. The main plate 78 and the lip 80 each include a top-facing surface and a bottom-facing surface, and each further includes an exterior-facing edge and an interior-facing edge. The connecting section 82 may join the main plate 78 and lip 80 by welding lengthwise edges of the connecting section to both the exterior-facing edge of the main plate and the interior-facing edge of the lip. A width of the connecting section 82 extends down from the bottom-facing surface of the main plate 78, such that the lip 80 is positioned lower than the main plate. The two rectangular overhang sections 84 may be attached to the interior-facing edge of the main plate 78 and extend down below the main plate. The saddle 20 may include three circular openings. A first and a second circular opening 86,88 each pass through a thickness of the lip 80. The first and second openings 86,88 may be individually positioned generally adjacent to proximal and distal edges of the lip 82, respectively. A third circular opening 90 passes through the thickness of the main plate 78. The third circular opening 90 may be positioned approximately midway between proximal and distal edges of the main plate and near the interior-facing edge of the main plate.

The lock plate 22 is a generally rectangular section made from steel, iron, or other metal suitable for heavy duty operation. The lock plate 22 includes a circular opening 92 positioned approximately in a center of the lock plate, with the circular opening passing through an entire thickness of the lock plate. In certain embodiments, the lock plate 22 may have small notches 94 cut out at its corners near its distal end, such that the lock plate can be fitted within a wheel support shaft of the first wheel assembly 14 that supports the wheels. The circular opening 92 of the lock plate 22 may generally be of similar size as the third circular opening 90 of the saddle 20, such that a securing member, such as a hitch pin, lynch pin, nut and bolt combination, or the like can pass through each of the openings and secure the lock plate 22 to the saddle 20 during operation of the first system 10, as will be discussed in more detail below. As used throughout, the term securing member may generally include any device or component that can be inserted through a circular opening to secure components together, such as hitch pin, lynch pin, nut and bolt combination, or the like.

Although the first base assembly 18 is described above, with specific reference to the saddle 20 and lock plate 22, it is understood that embodiments of the present invention include other forms of base assemblies that perform the same function in substantially the same way. For instance, embodiments of the present invention may include other base assemblies that can be removeably attached to a wheel assembly of a heavy-equipment machine and that provide support for remaining components of a system for installing and/or removing a continuous track.

As illustrated by FIG. 7, the first support assembly 24 may be formed from a generally square piece of metal tubing and made of steel, iron, or other metal suitable for heavy duty operation. A distal end of the first support assembly 22 includes two rectangular cutouts 96 that extend proximally from the distal end, down the length of the first support assembly 24. The cutouts 96 are positioned on both an exterior-facing surface and an interior-facing surface of the first support assembly 24. The first support assembly 24 additionally includes a plurality of circular pairs of openings that pass through both a top section and a bottom section of the first support assembly 24. The axes through each of the pairs of openings are generally aligned, such that a securing member, including a hitch pin, rod, or bolt can fit through the paired openings simultaneously. In certain embodiments of the present invention the plurality of circular pairs of openings may include five pairs of openings. In such an embodiment a first and a second pair of openings 98,100 may be positioned proximally with respect to the third, fourth, and fifth pair of openings 102,104,106. The first and second pairs of openings 98,100 may further be aligned with the first and second circular openings 86,88 of the saddle 20, such that a securing member can pass through each of the aligned openings so as to secure the first support assembly 24 to the saddle 20 during operation of the first system 10, as will be discussed in more detail below. Further, the third, fourth, and fifth pairs of openings 102,104,106 may be used to secure the first extension assembly 16 to the first support assembly 24. For instance, a securing member can pass through either of the third, fourth, or fifth circular pairs of openings 102,104,106 and the short pipe 68 of the first extension assembly 16, such as to secure the first extension assembly to the first support assembly 24.

Although the first support assembly 24 is described above with specific reference to its components, it is understood that embodiments of the present invention include other forms of support assemblies that perform the same function in substantially the same way. For instance, embodiments of the present invention may include other support assemblies that can be connected to a wheel assembly and/or other components of a system, and that further provide foundational support for the system during installation and/or removal of a continuous track.

Turning now to FIG. 8, the first installation bracket 26 may include the L-shaped bracket 28 and the track interface bracket 30. The L-shaped bracket 28 may be formed from a single piece of steel, iron, or other metal suitable for heavy duty applications. The L-shaped bracket 28 includes a proximal section 108 and a side section 110 positioned perpendicular to the proximal section. The proximal section 108 includes proximal and distal-facing surfaces. The side section 110 includes interior and exterior-facing surfaces. The L-shaped bracket 28 may be formed from a single rectangular piece of metal. In other embodiments, the L-shaped bracket 28 may be formed by welding sides of two rectangular pieces of metal together, thus forming an L-shape. In certain embodiments, such as shown in FIGS. 1-2, the proximal-facing surface of the proximal section 108 of the L-bracket 28 may be attached to a distal end of the piston rod 66 of the first extension assembly 16 by weld or other suitable means of attachment. The proximal section 108 of the L-shaped bracket 28 may be welded to the piston rod 66 such that a center point of the piston rod's distal end is positioned approximately at a center of the proximal section. The L-shaped bracket 28 is further positioned such that the side section 110 extends away from the piston rod 66. In certain embodiments, the piston rod 66 may rotate within the hollowed barrel 64 of the first extension assembly 16, such that the L-shaped bracket 28 may rotate 360 degrees with respect to the extension assembly 16. Returning to FIG. 8, the side section 110 may include a circular opening 112 that extends through a thickness of the side section and is approximately centered on the side section.

Remaining with FIG. 8, the track interface bracket 30 may broadly comprise an arcuate plate 114 and an arcuate perimeter section 116 attached to a perimeter edge of the arcuate plate. In embodiments, the arcuate plate 114 may be generally hemispherical to provide an arcuate plate. The arcuate plate 114 may be made from steel, iron, or other metal suitable for heavy-duty operation. The arcuate plate 114 may have a diameter edge and a circumferential edge. The arcuate plate 114 further includes two circular openings that extend through the thickness of the plate, thus creating circular openings through an interior-facing surface and an exterior-facing surface of the arcuate plate. A first circular opening 118 is positioned adjacent to the diameter edge and along a centerline that bisects the arcuate plate 114. A second circular opening 120 is spaced distally from the first circular opening 118 and is also positioned along the centerline. The arcuate perimeter section 116 is made from steel, iron, or other metal suitable for heavy-duty operation. The arcuate perimeter section 116 is generally concave, such that an interior face of the arcuate perimeter contacts the circumferential edge of the arcuate plate 114 and extends laterally (i.e., interiorly and exteriorly) away from both the interior-facing and exterior-facing surfaces of the arcuate plate. The perimeter section 116 may be attached to the arcuate plate 114 by weld or other suitable means of attachment. Portions of the perimeter section 116 may extend away from the interior-facing surface of the arcuate plate 114 and may include two corner tabs 122 that are bent in an inward direction, such that the corner tabs point generally towards a center point of the diameter edge of the arcuate plate. The track interface bracket 30 may be connected to the L-shaped bracket 28 by inserting a securing member through the opening 112 in the side section 110 of the L-shaped bracket and either the first or second circular openings 118,120 of the track interface bracket. Once the track interface bracket 30 is attached to the L-shaped bracket 28, which is itself attached to the first extension assembly 16, the track interface bracket may operate in conjunction with the remaining components of the first system 10 to assist in extending a new continuous track out past front idler wheels of the first wheel assembly 14, where the new continuous track can be installed over the front idler wheels.

Although the first installation bracket assembly 26 is described above with specific reference to the L-shaped bracket 28 and the track interface bracket 30, it is understood that embodiments of the present invention include other forms of installation bracket assemblies that perform the same function in substantially the same way. For instance, embodiments of the present invention may include other installation bracket assemblies that can be used to interface with continuous tracks or other components of wheel assemblies and to assist with the installation and/or removal of the continuous tracks.

In certain embodiments, the system 10 may include the push-pull bar 32, which, as illustrated by FIG. 9, generally includes a rectangular main member 124 with proximal and distal ends; two small rectangular sections 126 attached to a top and a bottom edge of the distal end of the main member; and a thick rectangular proximal piece 128, which may be attached to the proximal end of the main member. The main member 124 is made from steel, iron, or other metal suitable for heavy duty operation. The main member 124 includes an interior-facing surface and an exterior-facing surface. The main member further includes a circular opening 130 that passes through a thickness of the main member 124 and is positioned adjacent to the member's distal end, between the two small rectangular sections 126. The two small rectangular sections 126 may be made from steel, iron, or other metal suitable for heavy duty operation. The two small rectangular sections 126 each include a top-facing surface and a bottom-facing surface. The bottom-facing surface of one of the sections is attached to a top edge of the main member 124 by weld or other suitable method of attachment. The top-facing surface of the other section is attached to a bottom edge of the main member 124. The distal end of the main member 124 is generally aligned with distal ends of the two small rectangular sections 126. The proximal piece 128 is made from steel, iron, or other metal suitable for heavy duty operation. The proximal piece 128 is attached to the main member 124 by welding or otherwise securing a width of the proximal piece to the proximal end of the main member. The proximal piece 128 is positioned such that interior and exterior-facing surfaces of the section are generally parallel with the interior and exterior-facing surfaces of the main member 124. The proximal piece 128 includes a circular opening 132 that passes through its interior and exterior-facing surfaces. The circular opening 132 is generally centered on the proximal piece 128. As will be described in more detail below, the push-pull 32 bar may attached to the L-shaped bracket 28 such that the first extension assembly 16 can be used to retract or extend the drive support assembly 34 to assist with removing and installing the continuous track on the first wheel assembly 14 of the first heavy equipment machine.

Embodiments of the present invention provide for the first system 10 to be used to remove and/or install continuous tracks on wheel assemblies of heavy-equipment machines. In certain embodiments, the present invention may be used to remove and install continuous tracks on a wheel assembly similar to first wheel assembly 14 of a heavy equipment machine, such as may be found on a Caterpillar™ 267, 777, or 287. With reference to FIG. 10, the first wheel assembly 14 broadly comprises: front and rear idler wheels 136,138, with the front idler wheels including an interior, a middle, and an exterior wheel and the rear idler wheels including an interior, a middle, and an exterior wheel; a wheel support shaft 140, extending down a length of the first wheel assembly and supporting each wheel of the wheel assembly; five exterior bogie wheels disposed between the front and rear exterior idler wheels, with the bogie wheels including a first bogie wheel 142, a second bogie wheel 144, a third bogie wheel 146, a fourth bogie wheel 148, and a fifth bogie wheel 150; the drive support assembly 34 generally orientated above the fourth and fifth bogie wheels and connected to the first wheel assembly; and a track tensioner 152 that connects a portion of the wheel support shaft 140 of the first wheel assembly 14 to the drive support assembly 34. Although the following embodiments of the present invention are described in relation to the first wheel assembly 34, similar to a wheel assembly for the Caterpillar™ 267, 777, or 287, such description is purely for illustrative purposes, and it is understood that embodiments of the present invention provide for the installation of tracks on a variety of wheel assemblies for a variety of heavy-equipment machines.

To begin a process of replacing an original track with a new track, the original track must first be removed from the first wheel assembly 14 of the first heavy-equipment machine. If the first heavy-equipment machine has a boom, the boom must be raised and placed in a locked position to make room for a working area. A side of the first heavy equipment machine from which the original track is to be replaced must be raised approximately six inches off the ground by jack or lift that is commonly known in the art and that is sturdy enough to support a weight of the heavy-equipment machine. With reference to FIG. 10, the track tensioner 152 of the first wheel assembly 14 is disconnected from the wheel support shaft 140 and the drive support assembly 34 by removing a front tensioner pin 154 from a front tensioner bracket 156 and a rear tensioner pin 158 from a rear tensioner bracket 160. After the track tensioner 152 is removed, the first base assembly 18 and first support assembly 24 may be attached to the first wheel assembly 14, such as is illustrated in FIG. 11. The saddle 20 may be placed between a gap in the wheel support shaft 140 between the second and third bogie wheels 144,146, with the main plate 78 positioned over the bogie wheels and the lip 80 extending out away from the wheel support shaft. The lock plate 22 is positioned above the saddle 18 such that the circular opening 92 of the lock plate is aligned with the circular opening 90 of the main plate 78 of the saddle. A securing member is inserted through both openings to secure the saddle 20 and lock plate 22 together. The first support assembly 24 is attached to the first base assembly 18 and is positioned below the lip 80 of the saddle 18. The first and second circular openings 86,88 of the lip 80 are aligned with the first and second circular openings 98,100 of the first support assembly 24. The first support assembly 24 is secured to the saddle 20 by inserting two securing members through the aligned openings. Once the first base assembly 18 and first support assembly 24 have been connected together and attached to the first wheel assembly 14 of the heavy-equipment machine, pinch bolts 162 that secure the drive support assembly 34 to the first wheel assembly 14 may be removed.

Next, the first extension assembly 16, which may include the hydraulic cylinder 64, is attached to the first wheel assembly 14 of the heavy-equipment machine to assist in disengaging the drive support assembly 34. It is noted that when the hydraulic cylinder 64 is used to disengage the drive support assembly 34, the directions (i.e., proximal and distal) of the hydraulic cylinder are reversed, such that the proximal end of the first extension mean faces in the distal direction, and vice-a-versa. The proximal end of the hydraulic cylinder 62 is attached to the first wheel assembly 14 by aligning the longitudinal axis of the short pipe 68 of the hydraulic cylinder with the front tensioner bracket 156 that had previously secured the track tensioner 152. The front tensioner pin 154 is inserted through the front tensioner bracket 156 and the short pipe 68 to secure the proximal end of the hydraulic cylinder 62 to the wheel support shaft 140 of the first wheel assembly 14. The proximal end of the push-pull bar 32 is attached to the rear tensioner bracket 160 that previously secured the track tensioner 152 to the drive support assembly 34. The rear tensioner pin 158 is inserted through the rear tensioner bracket 160 and the circular opening 132 of the proximal piece 128 of the push-pull bar 32 to secure the proximal end of the push-pull bar to the drive support assembly 34. The L-shaped bracket 28 of the first installation bracket assembly 26 is attached to the distal end of the push-pull bar 32 by aligning the circular opening 112 of the side section 110 of the L-shaped bracket 28 with the circular opening 130 of the main member 124 of the push-pull bar 32. Before connecting the L-shaped bracket 28 and the push-pull bar 32, the side section 110 of the L-shaped bracket must be rotated such that it is positioned to face either towards an exterior or interior of the first wheel assembly 14. In addition, the piston rod 66 of the hydraulic cylinder 62 may need to be stroked out to extend far enough to align with the push-pull bar 32. A securing member may be inserted through the circular openings to secure the L-shaped bracket 28 and push-pull bar together 32.

Figure 12:
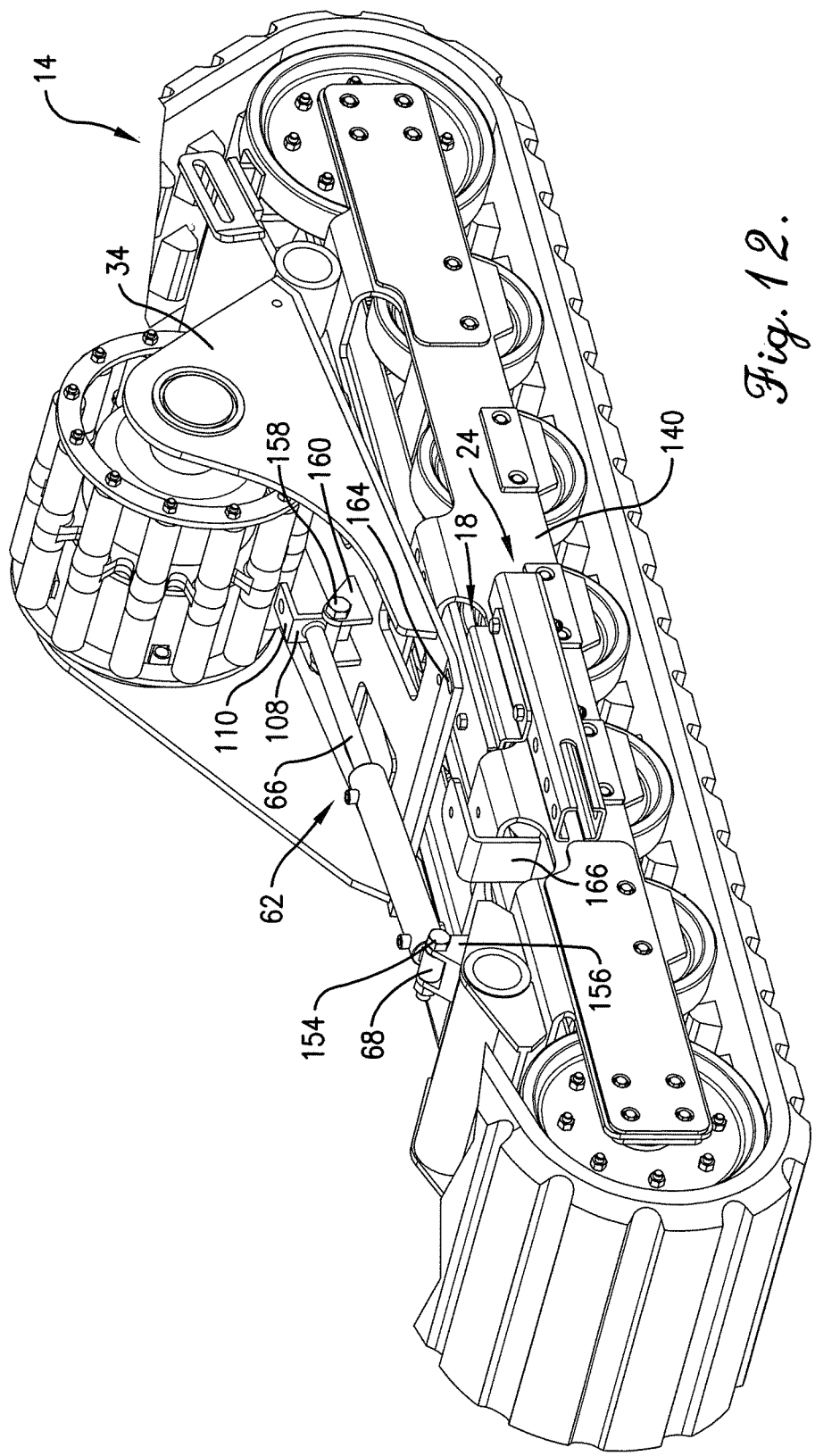
FIG. 12 is a distal perspective view of the first wheel assembly shown in FIGS. 1 and 10-11, with a partial cutaway of a continuous track to expose the drive support assembly being disengaged.
Figure 13:
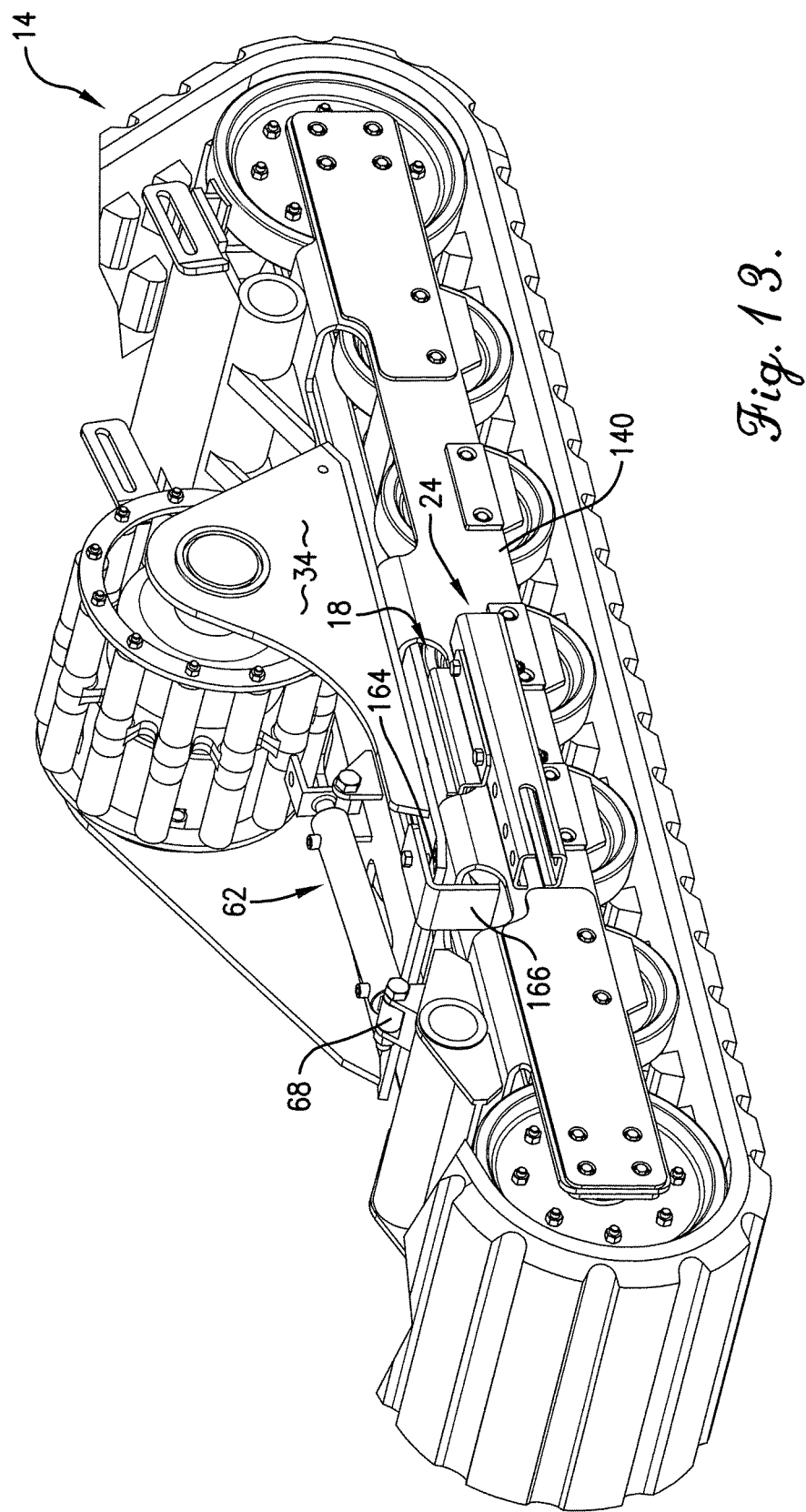
FIG. 13 is a distal perspective view of the first wheel assembly shown in FIGS. 1 and 10-12, with a partial cutaway of the continuous track to expose the drive support assembly being partially disengaged.
Figure 14:
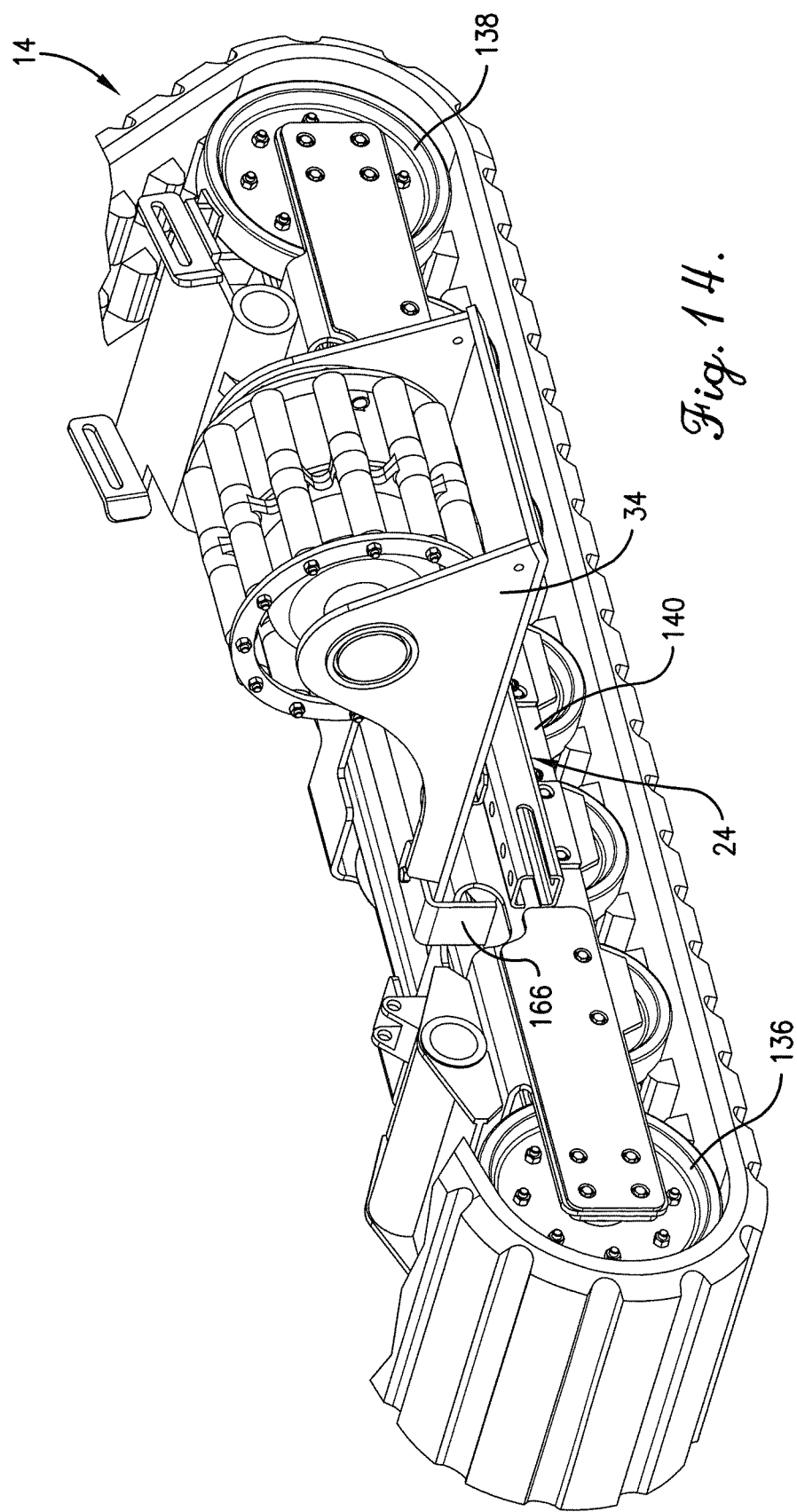
FIG. 14 is a distal perspective view of the first wheel assembly shown in FIGS. 1 and 10-13, with a partial cutaway of the continuous track to expose the drive support assembly being fully disengaged.

A grease gun, or other source of hydraulic pressure, is attached to the second grease nipple 74 located at the distal end of the hollowed barrel 64 of the hydraulic cylinder 62. The piston rod 66 is thereby de-stroked, pulling the drive support assembly 34 distally, towards the front of the first wheel assembly 14 and relieving tension in the original continuous track. Once the piston rod 66 of the hydraulic cylinder 62 has been fully de-stroked, the push-pull bar 32 is detached from the L-shaped bracket 28 and removed from the drive support assembly 32. With reference to FIG. 12, the rear tensioner pin 158 may be inserted through the rear tensioner bracket 160 that previously secured the track tensioner 152 to the drive assembly 34. The piston rod 66 of the hydraulic cylinder 66 is rotated, such that the side section 110 of the L-shaped bracket 28 is facing in an upward direction. The piston rod 66 is thereafter stroked until the proximal section 108 of the L-shaped bracket 28 is positioned behind the rear tensioner pin 158. The piston rod 66 is again de-stroked, pulling the drive support assembly 34 further towards the front of the first wheel assembly 14 until a pivot hole 164, located at a distal end of the drive support assembly 34, is aligned with a pivot bracket 166 of the wheel support shaft 140 of the first wheel assembly 14, as illustrated in FIG. 13. A securing member is placed within aligned holes of the pivot bracket 166 and the pivot hole 165, such that the drive support assembly 34 may then be rotated out away from the first wheel assembly 14, as illustrated in FIG. 14. In some instances, a pry bar may be required to assist the user in rotating the drive support assembly 34. It is noted that the first extension assembly 16 and the push-pull bar 32 should also be completely removed from the first wheel assembly 14 before the drive support assembly 34 is rotated away.

Once the drive support assembly 34 has been rotated out of from the first wheel assembly 14, the original continuous track can be removed. Starting from the proximal end of the first wheel assembly 14 a rear portion of the original continuous track may be removed from the rear idler wheels 138. In certain instances, a pry bar may be used to assist in the removal of the original continuous track. After the rear portion of the rubber track has been removed, the remaining middle and front portions of the original continuous track may be removed.

Figure 15:
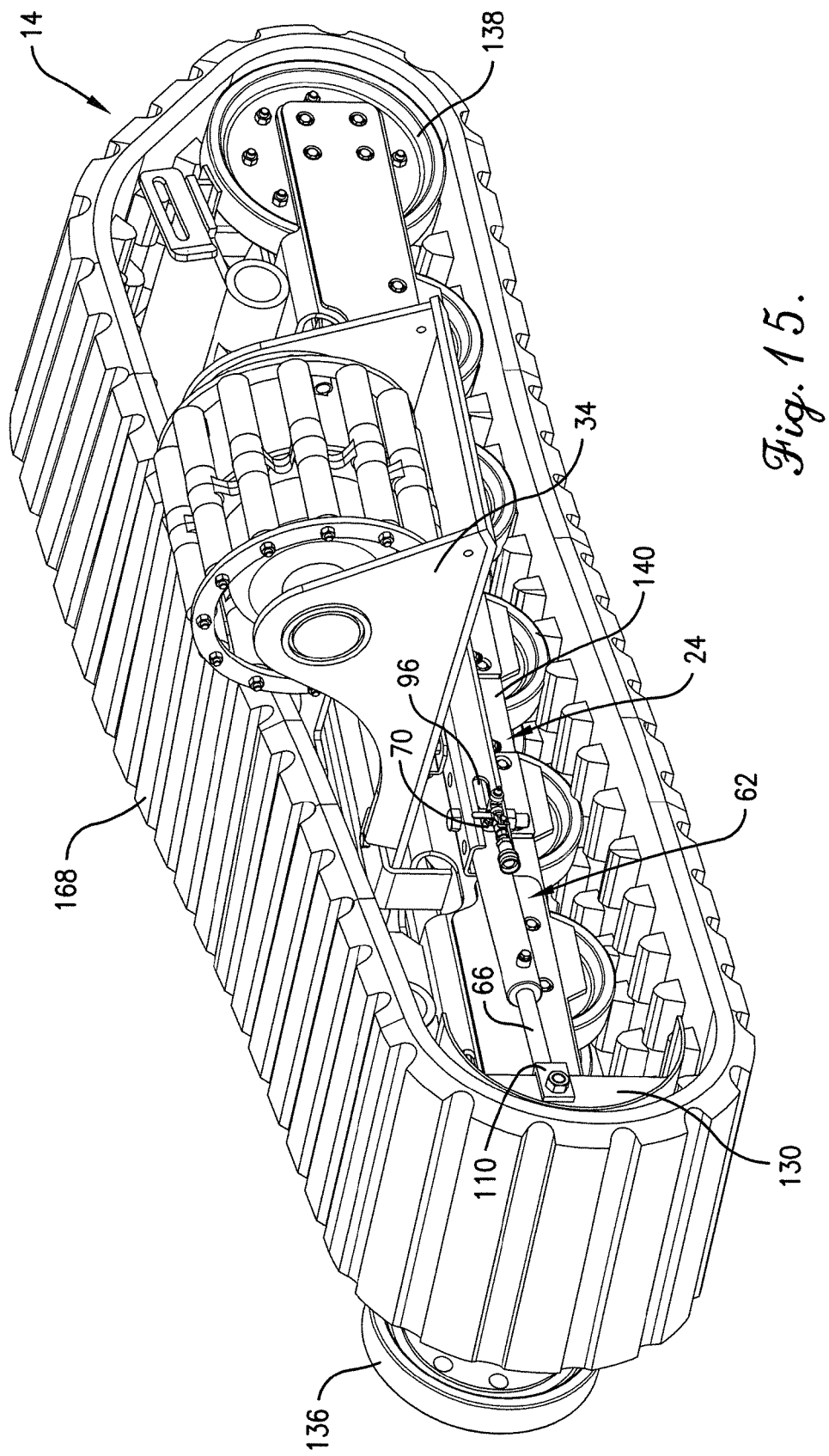
FIG. 15 is a distal perspective view of the first system of FIGS. 1 and 2 attached to first wheel assembly shown in FIG. 1, with the drive support assembly disengaged such that a new continuous track is partially installed on the first wheel assembly.
Figure 16:
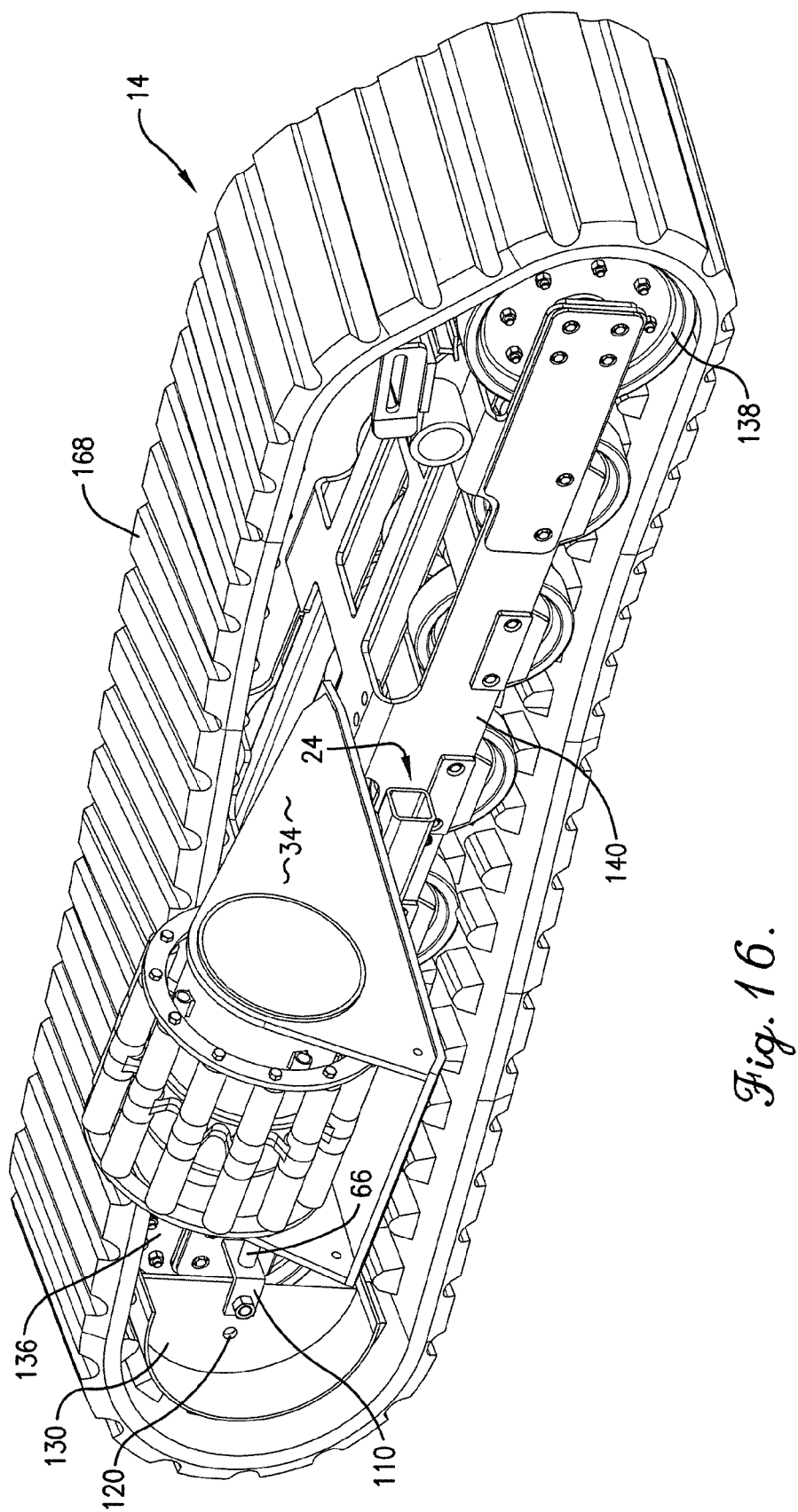
FIG. 16 is a proximal perspective view of the first system and first wheel assembly of FIG. 15.

With reference to FIGS. 15-16, a new continuous track 168 may be installed on the first wheel assembly 14. To begin, the proximal end of the first extension assembly 16, which may include hydraulic cylinder 62, should be attached to the distal end of the first support assembly 24 by first aligning the longitudinal axis of the hydraulic cylinder's short pipe 68 with either the third, fourth, or fifth circular opening pair 102,104,106 of the first support assembly. The selection of either the third, fourth, or fifth circular opening pair should be determined based on the required position and/or extension of the hydraulic cylinder 62 and the first installation bracket assembly 26 to properly extend the new continuous track 168. A securing member may inserted through the selected circular opening pair of the first support assembly 24 and the small pipe 68 to secure the hydraulic cylinder 62 to the first support assembly. The first grease nipple 70 and/or the valve assembly 72 should be positioned facing exteriorly, such that the first grease nipple is positioned within an exterior cutout 96 of the exterior-facing surface of the first support assembly 24. The side section 110 of the L-shaped bracket 28 should also be positioned facing exteriorly. The track interface bracket 30 may be connected to the L-shaped bracket 28 by aligning the circular opening 112 of side section 110 of the L-shaped bracket with either the first or second circular opening 118, 120 of the track interface bracket 130. The selection of either the first or second circular opening should be determined based on the required position and/or extension of the extension assembly 16 and the first installation bracket assembly 26. A securing member is inserted through the aligned circular openings. Once the track interface bracket 30 has been attached to the L-shaped bracket 28 and the hydraulic cylinder, the new continuous track 168 may be completely installed. The new continuous track 168 can be installed starting from the proximal end of the first wheel assembly 14 at the rear idler wheels 138 and continuing on towards the distal end of the first wheel assembly until the new continuous track is positioned over the track interface bracket 30. After the track has been installed on a rear portion of the wheel assembly, embodiments of the present invention provide for the new continuous track 168 to be efficiently installed over the front idler wheels 168. In certain embodiments, lubrication, such as soap, oil, grease, snake snot, or the like may be applied to the front idler wheels 136 and an exterior surface of the perimeter section 116 of the track interface bracket 30. A grease gun is attached to the first grease nipple 70, or the valve assembly 72, of the hydraulic cylinder 62, and the cylinder's piston rod 66 is stroked out, thereby extending the track install bracket 30 against interior drive lugs on an interior face of the new continuous track 168, such that the track install bracket 30 interfaces with the new continuous track. The piston rod 66 is stroked, thereby extending the new continuous track, until drive lugs of the new continuous track 168 clear the front idler wheels 136. Thereafter, the new continuous track 168 may be installed over the front idler wheels 136. In certain instances, it may be necessary to use a sledge hammer or other impact/pressure force against an exterior side of the new continuous track 168 until the new continuous track is completely aligned and installed over the front idler wheels 136.

Figure 17:
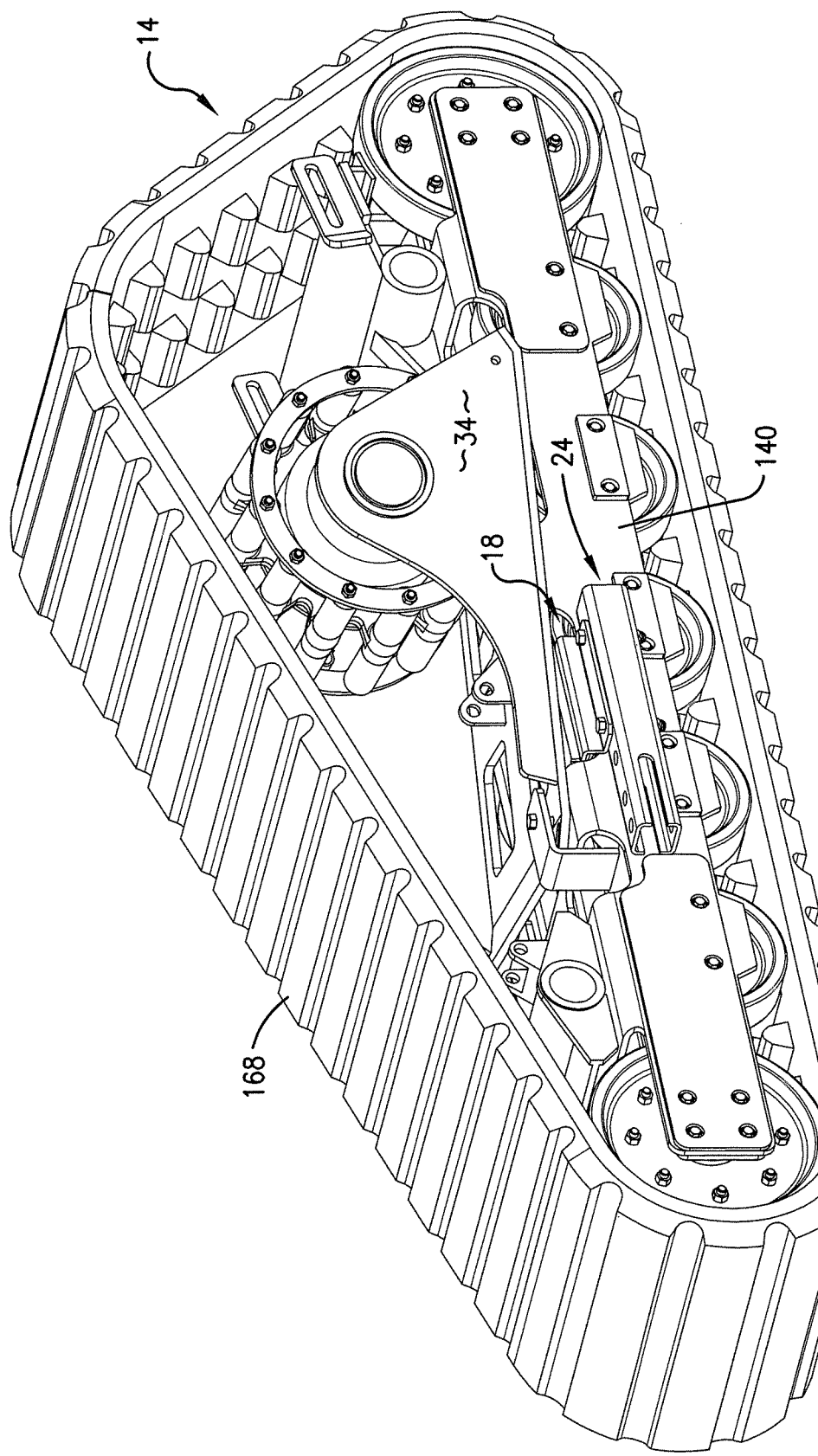
FIG. 17 is a distal perspective view of the first wheel assembly shown in FIGS. 15-16, with the drive support assembly being re-engaged.
Figure 18:
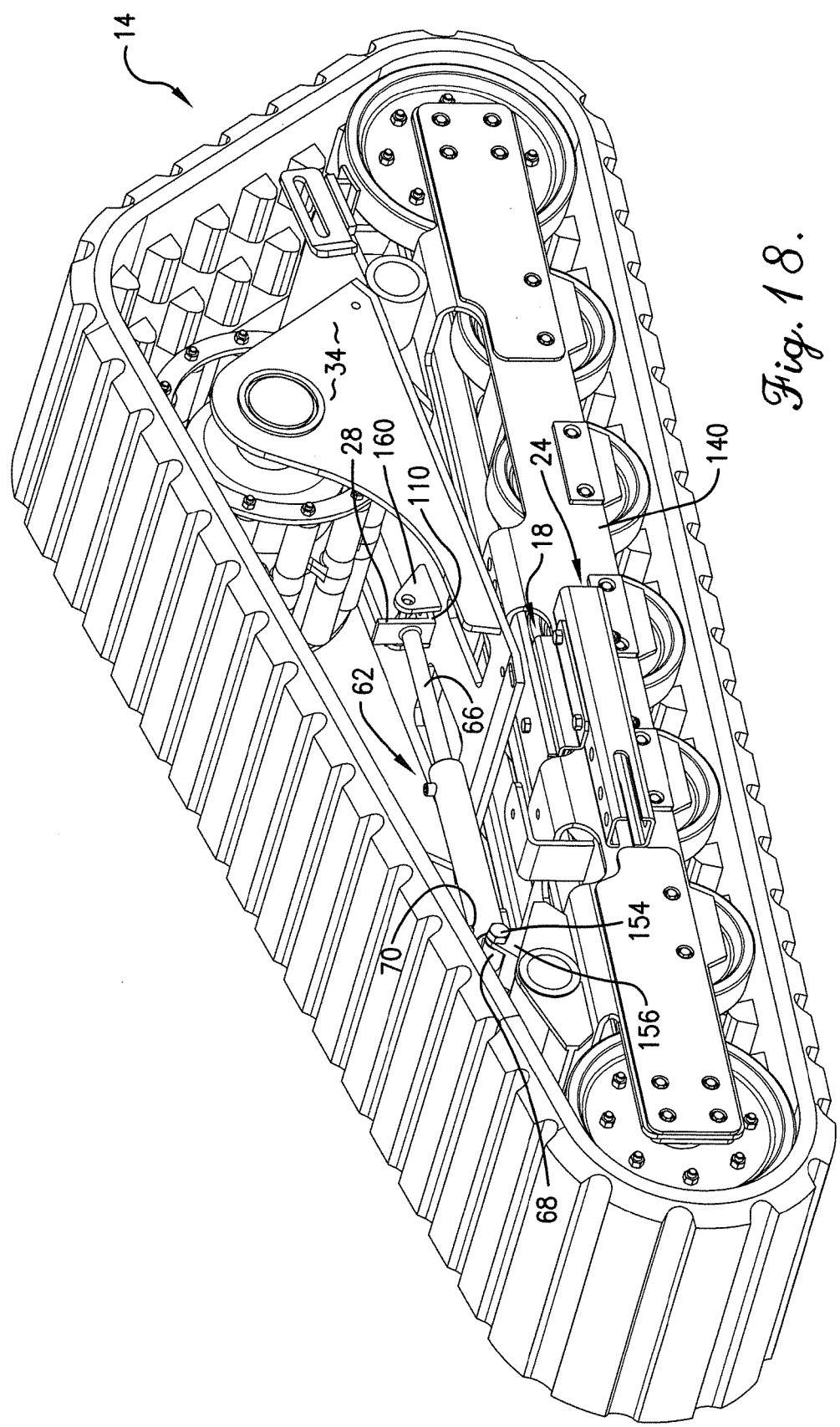
FIG. 18 is a distal perspective view of the first wheel assembly shown in FIGS. 15-17, with the drive support assembly being partially re-engaged.
Figure 19:
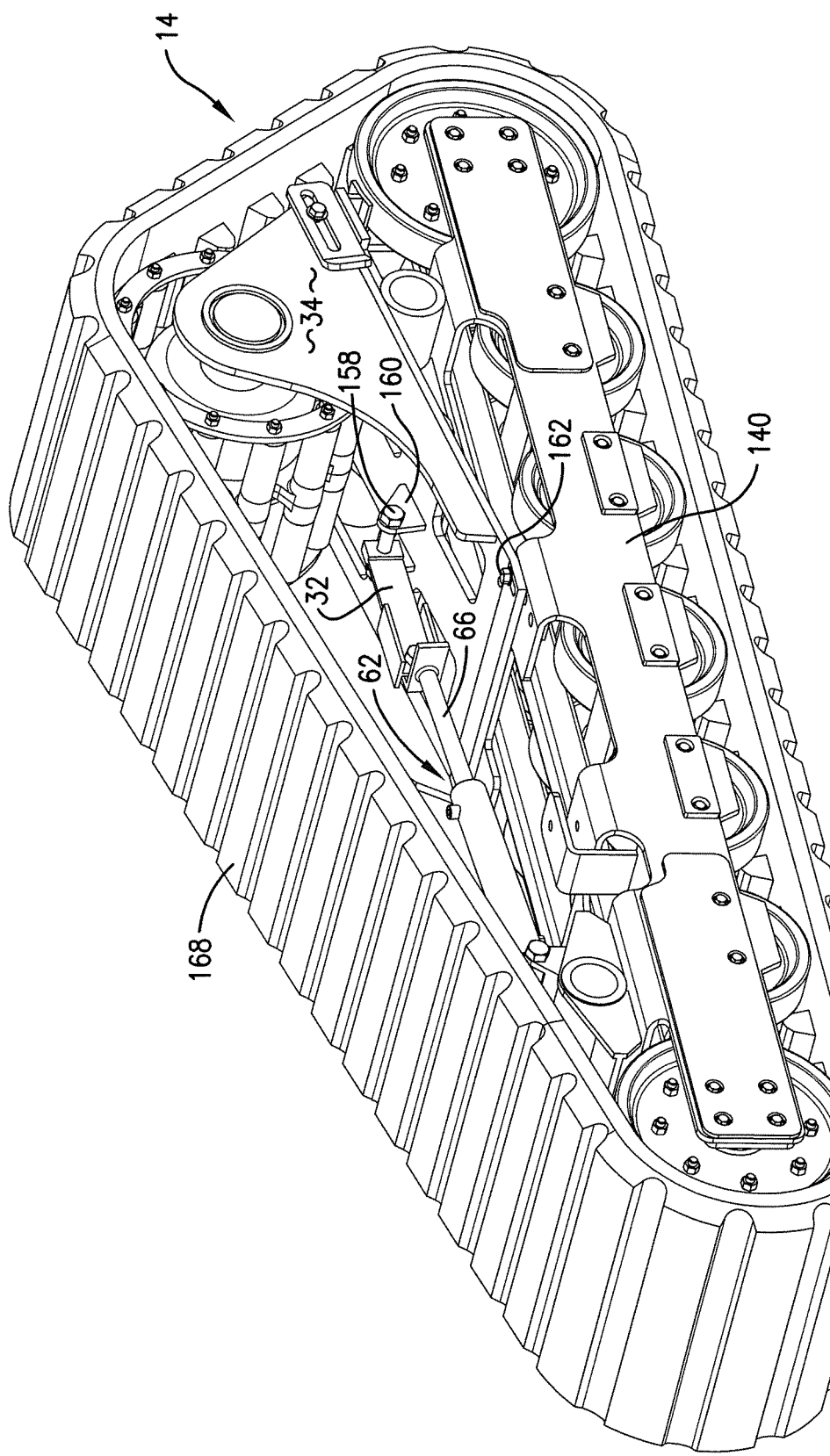
FIG. 19 is a distal perspective view of the first wheel assembly shown in FIGS. 15-18, with the drive support assembly being fully re-engaged.

Thereafter, the drive support assembly 34 can be rotated back towards the first wheel assembly 14 and into its original position, as illustrated in FIG. 17. A pry bar may be used to assist in rotating the drive support assembly 34 back in to position. The first extension assembly 16, which may include the hydraulic cylinder 62, and the first installation bracket assembly 26 may be removed from the first support assembly 24. With reference to FIG. 18, the short pipe 68 of the hydraulic cylinder 62 is then reattached to the front tensioner bracket 156 of the machine's frame by aligning the longitudinal axis of the short pipe with the front tensioner bracket. The front tensioner pin 154 is inserted through the aligned spaces to secure the hydraulic cylinder 62 in place. The piston rod 66 of the hydraulic cylinder 62 is rotated such that the side section 110 of the L-shaped bracket 28 is facing downward. A grease gun is attached to the first grease nipple 70 on the hydraulic cylinder's proximal end. The piston rod 66 of the hydraulic cylinder 62 is then stroked out until the L-shaped bracket 28 comes into contact with the rear tensioner bracket 160, which may or may not have the rear tensioner pin 158 inserted. The piston rod 66 is stroked out, causing the drive support assembly 34 to be pushed back proximally towards the rear of the first wheel assembly 14. Once the piston rod 66 is fully extended, the user can release some of the hydraulic fluid from the hydraulic cylinder 62, such that the piston rod 66 will de-stroke enough that the push-pull bar 32 can be attached to both the L-shaped bracket and the rear tensioner bracket 160, as illustrated in FIG. 19. The push-pull bar 32 is attached in the same manner as was described above for retracting the drive support assembly 34 toward the front of the first wheel assembly 14. Once the push-pull bar 32 has been attached, the piston rod 66 is again stroked-out, pushing the drive support assembly 34 towards the rear of the first wheel assembly 14 until the pinch bolts 162 can be reinserted into the drive support assembly 34 and the wheel support shaft 140, securing the drive support assembly to the wheel support shaft. The hydraulic cylinder 62 and push-pull bar 32 may then be removed from the first wheel assembly 14 and the track tensioner 152 can be reattached and torqued. The first support assembly 24 and the first base assembly 18 may also be removed from first wheel assembly 14.

Although this method has been described with its preferred embodiment(s), it is noted that equivalents may be employed and substitutions made herein without departing from the scope of the invention. For example, although embodiments of the present invention were described with reference to installation of a continuous track on first wheel assembly 14, similar to a wheel assembly for a Caterpillar™ 267, 777, or 287, it is understood that such description was simply for descriptive purposes, and that embodiments the present invention may be used to install tracks on a variety of wheel assemblies on various heavy-equipment machines.

FIGS. 3-4 illustrate the second system 40 of embodiments of the present invention for installing a continuous track 42 on the second wheel assembly 44. The second system 40 broadly comprises the second extension assembly 46, which may be similar in all respects to the first extension assembly 14, and including proximal and distal ends; the second base assembly 48 that can be removeably connected to the second wheel assembly 44; the second support assembly 50 including the U-shaped saddle 52 removeably attached to the second wheel assembly, and the jack-screw assembly 54 attached to the U-shaped saddle and providing support for the second extension assembly; and the second installation bracket assembly 56 including an L-shaped bracket 58, which may be similar in all respects to the L-shaped bracket 28 from the first system 10 and which may be attached to the distal end of the second extension assembly 46. The second system 40 may generally be used with a wheel assembly similar to the second wheel assembly 44 illustrated in FIG. 3, which includes an exterior front idler wheel 60 and at least three bogie wheels. When the second system 40 is removeably secured to the second wheel assembly 44, the components of the second system 40 operate to efficiently guide the exterior front idler wheel 60 and continuous track 42 onto the second wheel assembly and aligned into their functional positions.

Beginning with the second extension assembly 46, as previously described, the second extension assembly may be similar in all respects to the first extension assembly 16 and may include any assembly or device capable of performing lifting or extension operations, such as mechanical lifting device (i.e., a jack-screw, farm jack, or the like), pneumatically-actuated lifting device, hydraulically-actuated lifting device, electrically-actuated lifting device, or the like. In embodiments where the second extension assembly 46 comprises the hydraulically-actuated lifting device, the extension assembly may include a hydraulic cylinder such as the hydraulic cylinder 62 illustrated in FIG. 5. The hydraulic cylinder 62 may broadly comprise the hollowed barrel 64; the piston rod 66 free to actuate within the hollowed barrel; and the short pipe 68 attached to a proximal end of the hollowed barrel. The hollowed barrel 64 and the piston rod 66 work together like a hydraulic cylinder known in the art. For instance, the hollowed barrel 64 may include the first grease nipple 70 attached to its outer surface near its proximal end. The grease gun (not shown) can be attached to the first grease nipple 70, via the valve assembly 72, and can force grease into an opening of the first grease nipple, through a wall of the hollowed barrel 64, and into the interior volume of the proximal end of the hollowed barrel. The grease provides pressure against the piston rod 66, causing the piston rod to actuate and extend distally out of the hollowed barrel 64 (i.e., to "stroke"). To retract the rod (i.e., to "de-stroke"), the valve in the first grease nipple 70 may be opened (e.g., via valve assembly 72). The grease may then purge out of the hollowed barrel 64, allowing for the piston rod 66 to retract back inside the hollowed barrel. In further embodiments, the hydraulic cylinder 62 may include a second grease nipple 74 adjacent to the distal end of the hollowed barrel 64. The grease gun may be attached to the second grease nipple 74 to force grease into a void in the distal end of the hollowed barrel 64, thus causing the piston rod 66 to de-stroke. In additional embodiments of the present invention, other types of hydraulic pressure applicators may be used, such as portable hydraulic pumps (e.g., a portable power pump) or the like. The valve assembly 72 may include quick release attachment/detachment mechanisms, such that hydraulic pressure applicators can quickly connect and de-connect from the hydraulic cylinder 62. In embodiments in which other extension assembly are used, additional sources of pressure (e.g., air pumps, electrical power sources, etc.) may be applied to the first extension assembly, such as to provide the power to cause the extension assembly to extend and retract.

The hollowed barrel 64 may be made of steel, iron, or any other metal suitable for heavy-duty applications. The piston rod 66 may be formed from a solid piece of chrome plated steel, iron, or other metal suitable for heavy duty applications. In a retracted position, the piston rod 66 may be positioned entirely within the hollowed barrel 64. The hydraulic cylinder's short pipe 68 is made from steel, iron, or other metal suitable for heavy duty applications. The short pipe 68 is positioned on the proximal end of the hollowed barrel 64 and is positioned such that a longitudinal axis of the short pipe is generally perpendicular to a longitudinal axis of the hollowed barrel. The short pipe 68 may be attached to the hollowed barrel 64 by welding an exterior surface of the short pipe to the distal end of the hollowed barrel.

With reference to FIG. 20, the second base assembly 48 broadly comprises extended top and bottom square pipes 180,182 opposing a short rectangular pipe 184. In operation, the second base assembly 48 may be removable attached to the second wheel assembly 44 and functions to provide a foundational support for the second extension assembly 46. The top and bottom square pipes 180,182 may be made from steel, iron, or other metal suitable for heavy duty operation. The longitudinal axes of the top and bottom square pipes 180,182 are generally parallel, and the top and bottom square pipes extend toward an interior of the second wheel assembly 44 away from the short rectangular pipe 184. Each of the top and bottom square pipes 180,182 includes a top section 186 and a bottom section 188, with the bottom section of the top square pipe facing the top section of the bottom square pipe. The bottom section 188 of the top square pipe 180 and the top section 186 of the bottom square pipe 182 are separated by the short rectangular pipe 184, as discussed below. The top and bottom square pipes 180,182 each further include proximal and distal sections 190,192 and interior and exterior ends 194,196.

The top and bottom square pipes 180,182 each have circular openings 198 through their top and bottom sections 186,188. The circular openings 198 are positioned adjacent to the interior ends 184 of the square pipes 180,182 and are centered between the proximal and distal sections 190,192 of their respective pipes. An axis through each of the circular openings on the top square pipe 180 are aligned with an axis of the circular openings on the bottom square pipe 182, such that a securing member can fit through the aligned pairs of circular openings. Finally, a square support bar 200 made from steel, iron, or other metal suitable for heavy-duty operations may be positioned between the top and bottom square pipes 180,182. The square support bar 200 may be positioned approximately midway between the interior and exterior ends 194, 196 of the top and bottom square pipes 180,182 and may act as a structural support member for the top and bottom square pipes. The square support bar 200 may be secured to the top and bottom square pipes 180,182 by weld or other suitable method.

The short rectangular pipe 184 is made from made from steel, iron, or other metal suitable for heavy duty operation. The short rectangular pipe 184 is hollow along its length, with an interior size sufficient to permit the distal end of the second extension assembly 46 to be positioned inside an interior of the short rectangular pipe. The short rectangular pipe 184 includes an interior section 202 and an exterior section 204, and further includes a top section 206 and a bottom section 208. The short rectangular pipe 184 may additionally include a distal opening and a proximal opening; however, the proximal opening may be optional. The longitudinal axis of the short rectangular pipe 184 is generally perpendicular and non-intersecting with the longitudinal axes of the top and bottom square pipes 180,182. The short rectangular pipe 184 is positioned between the top and bottom square pipes 180,182 such that the exterior-facing surface of the exterior section 204 of the short rectangular pipe is generally flush with the exterior ends 196 of the top and bottom square pipes 180,182. In addition, the proximal opening of the short rectangular pipe 184 may be flush with the proximal-facing sides of the proximal sections 190 of the top and bottom square pipes 180,182. Further, the top-facing surface of the top section 206 of the short rectangular pipe 184 may be flush with bottom-facing surface of the bottom section 188 of the top square pipe 180, and the bottom-facing surfaces of the bottom section 208 of the short rectangular pipe may be flush with the top-facing surface of top section 186 of the bottom square pipe 182. The short rectangular pipe 184 may be secured to the top and bottom square pipes 180,182 via weld or other suitable method of attachment.

The short rectangular pipe 184 includes two circular openings 210 through its top and bottom sections 206,208. The axes through each of the circular openings 210 are generally aligned, such that a securing member can fit through each of the openings simultaneously. In general, the two circular openings 210 should be correlated in size with the short pipe 68 of the second extension assembly 46, such that the securing member can be passed through the each of the two circular openings 210 and the short pipe 68, thus securing the second extension assembly 46 to the second base assembly 48. In addition, the interior section 202 the short rectangular pipe 184 may have a small rectangular notch 212 formed on its distal end. The rectangular notch 212 may provide for the second extension assembly 46 to fit more easily within the interior of the short rectangular pipe 184.

Although the second base assembly 48 is specifically described above, it is understood that embodiments of the present invention include other forms of base assemblies that perform the same function in substantially the same way. For instance, embodiments of the present invention may include other base assemblies that can be removeably attached to a wheel assembly of a heavy-equipment machine and that provide foundational support components of a system for installing and/or removing a continuous track.

Figure 21:
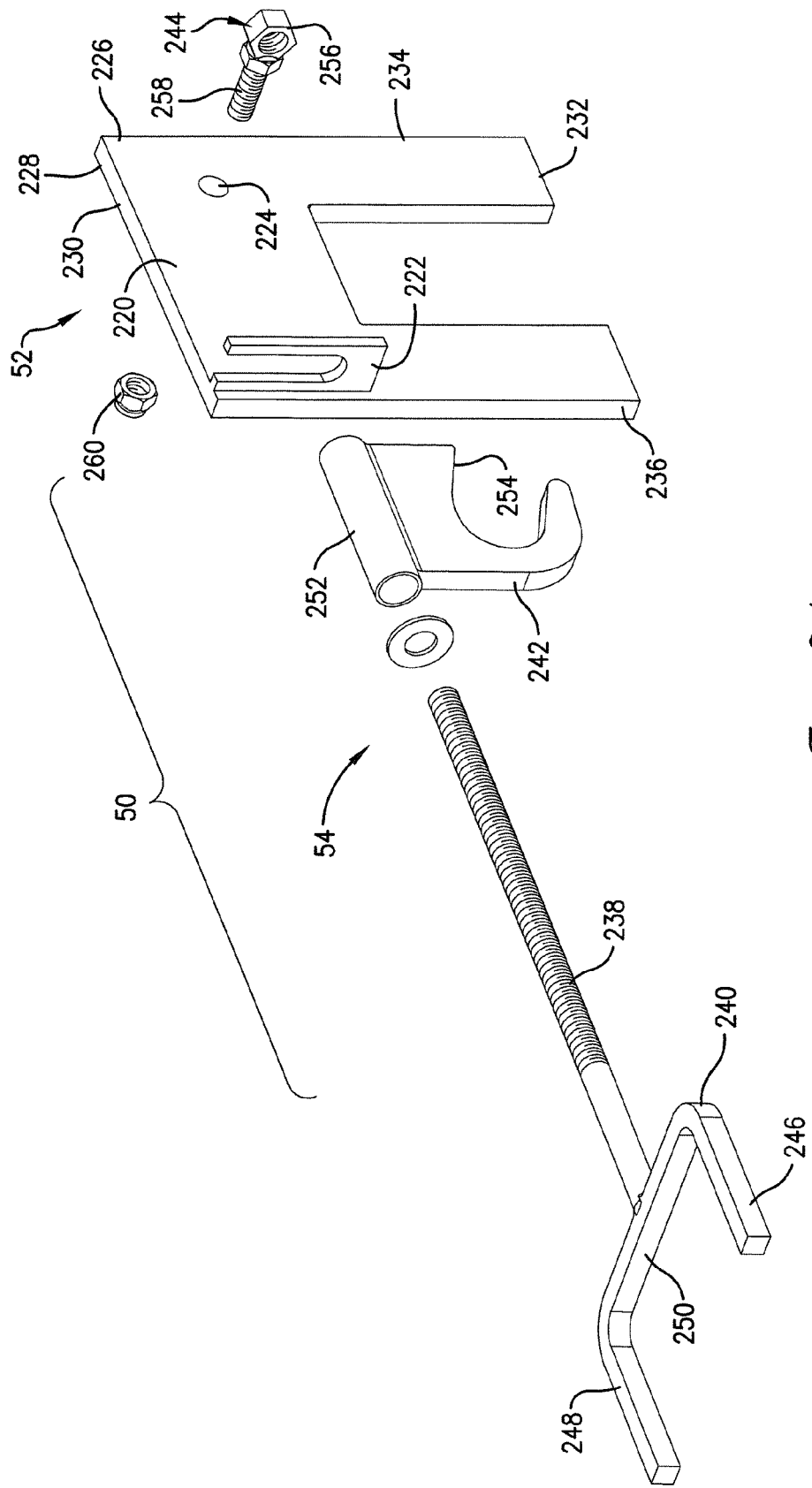
FIG. 21 is an exploded view of a second support assembly of the second system shown in FIG. 4, including a U-shaped saddle and a jack-screw assembly.

As illustrated by FIG. 21, the second support assembly 50 broadly includes the U-shaped saddle 52, which in operation, may be removeably attached to the second wheel assembly 44, and a jack-screw assembly 54 attached to the U-shaped saddle and providing support for the second extension assembly 46. Beginning with the U-shaped saddle 52, it broadly includes a U-shaped main plate 220, a U-shaped bracket 222 connected to the U-shaped main plate, and a circular opening 224 positioned through a thickness of the main plate. The U-shaped saddle 52 generally operates as a support for the jack-screw assembly 54.

The U-shaped main plate 220 is generally formed from a rectangular piece of steel, iron, or other metal suitable for heavy-duty operations. The U-shaped main plate 220 includes a proximal-facing surface 226 and distal-facing surface 228. The U-shaped main plate 220 further includes a top edge 230, a bottom edge 232, an interior edge 234, and an exterior edge 236. The U-shaped main plate 220 includes a rectangular cutout that provides the main plate with its u-shape. The rectangular cutout extends from the bottom edge 232 of the U-shaped main plate 220 more than approximately halfway between the bottom edge and the top edge 230 of the U-shaped main plate.

The U-shaped saddle 52 additionally includes the U-shaped bracket 222 positioned on the proximal-facing surface 226 of the U-shaped main plate 220 near a corner of the top and exterior edges 230,236 of the U-shaped main plate. The U-shaped bracket 222 is formed from a rectangular piece of steel, iron, or other metal suitable for heavy-duty operations. The U-shaped bracket 222 includes a u-shaped cutout that extends approximately from a top edge of the U-shaped bracket along nearly its entire length. The U-shaped cutout is sized such that the U-shaped bracket 222 can accept and retain portions of the jack-screw assembly 54, as will be discussed in more detail below. The U-shaped bracket 222 is secured to the U-shaped main plate 220 by welding a side of the U-shaped bracket to the proximal-facing surface 226 of the U-shaped main plate. The U-shaped saddle 52 further includes the circular opening 224 that passes through a thickness of the U-shaped main plate 220. A center of the circular opening 224 is positioned approximately near the top and interior edges 230,234 of the U-shaped main plate 220.

The jack-screw assembly 54 of the second support assembly 50 broadly comprises an extended threaded rod 238 with interior and exterior ends; a U-shaped handle 240 connected to the exterior end of the threaded rod; a hook-shaped body 242 that is free to move along the threaded rod, with the hook-shaped body including a cutout that is sized to receive the hollowed barrel 64 of the hydraulic cylinder 62; and a bolt assembly 244 that can be threadedly secured to the threaded rod. The jack-screw assembly 54 may be connected to the U-shaped saddle 52, via the bolt assembly 244, and the hook-shaped body 242 may receive the hollowed barrel 64 of the hydraulic cylinder 62, such that the jack-screw assembly and the U-shaped saddle can function to draw the hydraulic cylinder 62 towards the second wheel assembly 44 when operating the system 40, as will be discussed in more detail blow.

The threaded rod 238 of the jack-screw assembly 54 may be made from steel, iron, or other metal suitable for heavy-duty operations. The U-shaped handle 240 includes first and second side extensions 246,248, each opposing a middle section 250. Each of the first and second side extensions 246,248 and the middle section 250 may be made from a square bar of steel, iron, or other metal suitable for heavy-duty operations. The middle section 250 of the U-shaped handle 240 may be welded or otherwise attached to the exterior end of the threaded rod 238 at approximately a lengthwise center of the middle section. Ends of the first and second side extensions 246,248 may be welded or otherwise attached to ends of the middle section 250, such that the side extensions extend exteriorly away from the threaded rod 238. Further, longitudinal axes of the first and second side extensions 246,248 may each generally be approximately parallel with the longitudinal axis of the threaded rod 238.

The hook-shaped body 242 of the jack-screw assembly 54 includes a hollow section of pipe 252 that is welded or otherwise attached to a hook-shaped member 254. The hollow pipe 252 is made from steel, iron, or other metal suitable for heavy-duty operations. The hollow pipe 252 has a diameter such that the hook-shaped body 242 moves freely over the extended threaded rod 238. The hook-shaped member 254 may be formed from a piece of steel, iron, or other material of sufficiently high strength to be used in heavy-duty operations. The hook-shaped member 254 may be welded or otherwise secured to the hollow pipe 252. The hook-shaped member 254 includes a C-shaped cutout that is sized to accept the hollowed barrel 64 of the hydraulic cylinder 62. The C-shaped cutout is positioned on an interior side of the hook-shaped member 254 facing and is positioned such that the opening of the C-shaped cutout is directed towards the extended threaded rod's interior end. Further, the C-shaped cutout's axis of symmetry is angled approximately 20 degrees below the longitudinal axis of the threaded rod 238. In certain embodiments a washer may be inserted over the threaded rod 238, between the U-shaped handle 240 and the hook-shaped body 242 to provide support during manipulation of the jack-screw assembly 54.

The bolt assembly 244 includes a main nut 256 that is sized to be threaded onto the distal end of a threaded rod 238 and a small bolt 258. The bolt assembly 244 is made from steel, iron, or other metal suitable for heavy-duty operations. The main nut 256 is a standard nut with an inner diameter of sufficient size to be threaded onto the extended threaded rod 238. The bolt assembly 244 includes the small bolt 258 that is sized to fit into the circular opening 224 of the U-shaped main plate 220 of the U-shaped saddle 52. A head of the small bolt 258 is welded or otherwise attached to an exterior side of the main nut 256. The small bolt 258 is orientated such that its longitudinal axis is generally perpendicular with the longitudinal axis of the threaded rod 238. The bolt assembly 244 further includes a self-locking nut 260 that can be threaded onto a distal end of the small bolt 258 once the small bolt has been inserted through the circular opening 224 of the U-shaped main plate 220. Thus, the jack-screw assembly 54 and the U-shaped saddle 52 may be attached via the bolt assembly 244.

Although the second support assembly 50 is described above with specific reference to the U-shaped saddle 52 and jack-screw assembly 54, it is understood that embodiments of the present invention include other forms of support assemblies that perform the same function in substantially the same way. For instance, embodiments of the present invention may include other support assemblies that can be connected to a wheel assembly and/or other components of a system, and that further provide support for the extension assembly during installation and/or removal of a continuous track. As an exemplary illustration, the second support assembly 50 may include a ratchet strap assembly that is attached to the second wheel assembly 44 and functions to secure the second extension assembly 46 near the second wheel assembly during operation of the system.

The second installation bracket 56 may include the L-shaped bracket 58 member that is similar in all respects to the L-shaped bracket 28 of the first installation bracket. In particular, the L-shaped bracket 58 may be formed from a single piece of steel, iron, or other metal suitable for heavy duty applications. As illustrated by FIG. 22, the L-bracket 58 includes a proximal section 262 and a side section 264 that is positioned perpendicular to the proximal section. The proximal section 262 includes proximal and distal-facing surfaces. The side section 264 includes interior and exterior-facing surfaces. In some embodiments, the L-shaped bracket 58 may be formed from a single rectangular piece of metal. In other embodiments, the L-shaped bracket 58 may be formed by welding sides of two rectangular pieces of metal together, thus forming an L-shape. The side section 264 may include a circular opening 266 that extends through a thickness of the side section and is approximately centered on the side section. In operation, the proximal-facing surface of the proximal section 262 of the L-shaped bracket 58 may be attached to a distal end of the piston rod 66 of the hydraulic cylinder 62 by weld or other suitable means of attachment. The proximal section 262 of the L-shaped bracket 58 may be welded to the piston rod 66 such that a center point of the piston rod's distal end is positioned approximately at a center of the proximal section. The L-shaped bracket 58 is further positioned such that the side section 264 extends away from the piston rod 66. In certain embodiments, the piston rod 66 may rotate within the hydraulic cylinder 62, such that the L-shaped bracket 58 can be manually rotated 360 degrees with respect to the second extension assembly 46.

Although the second installation bracket assembly 56 is described above with specific reference to the L-shaped bracket 58, it is understood that embodiments of the present invention include other forms of installation bracket assemblies that perform the same function in substantially the same way. For instance, embodiments of the present invention may include other installation bracket assemblies that can be used to interface with continuous tracks or other components of wheel assemblies, such as idler wheels, and to assist with the installation and/or removal of the continuous track.

Figure 23:
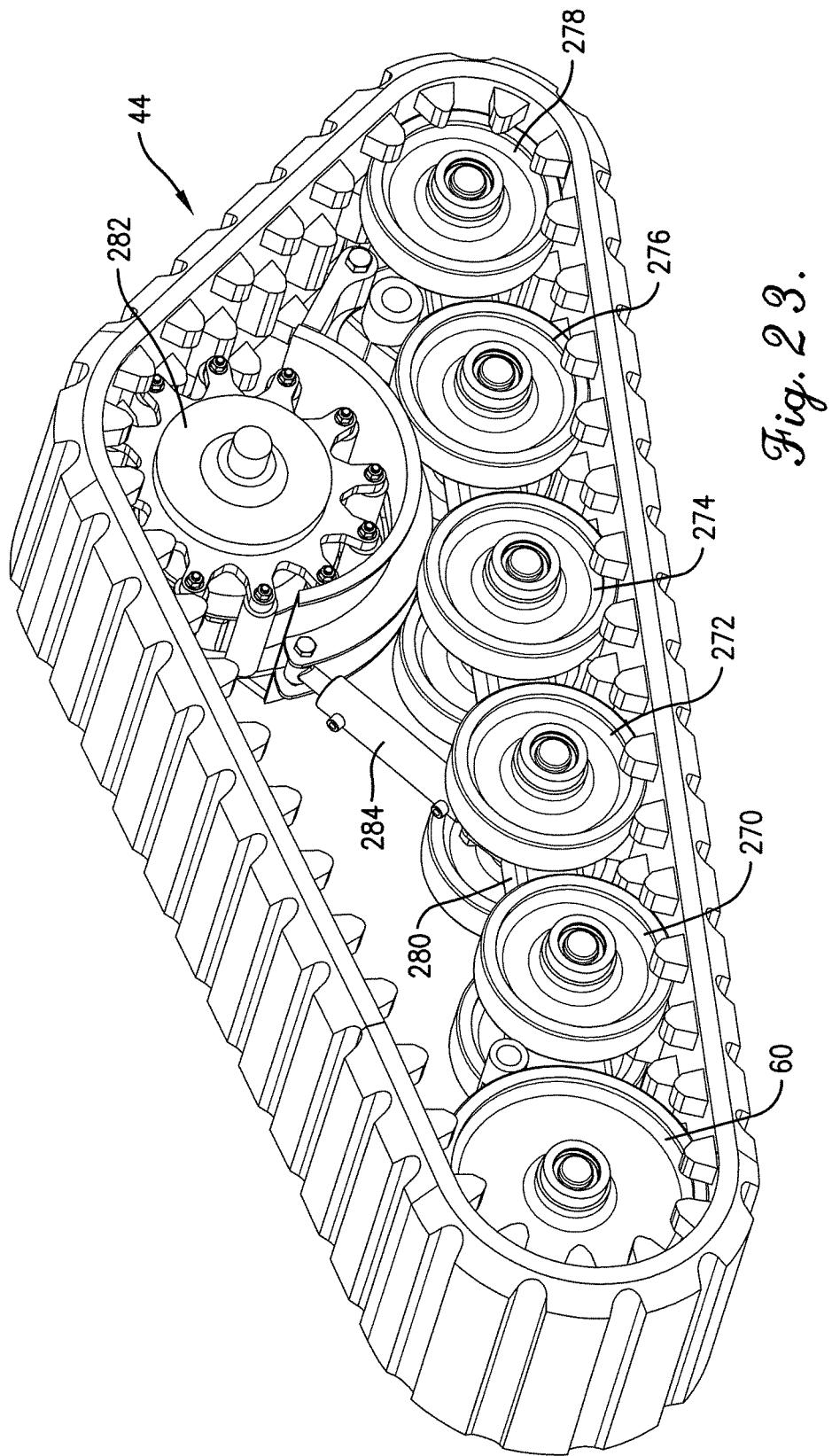
FIG. 23 is a distal perspective view of the second wheel assembly shown in FIG. 3.

Embodiments of the present invention provide for the second system 40 to be used to install a new continuous track on the second wheel assembly 44, which (with reference to FIG. 23) is similar to a wheel assembly on an ASV/Terex-RC/PT50. The second wheel assembly 44 generally includes the exterior front idler wheel 60; five exterior bogie wheels disposed between a front and a back of the second wheel assembly, with the bogie wheels including a first, a second, a third, fourth, and fifth bogie wheel 270, 272,274,276,278 as identified from the front to the back; a square frame shaft 280 that extends down a length of the second wheel assembly 44 and supports each of the wheels; a drive housing 282 that is generally orientated above the third and fourth bogie wheel and connected to the second wheel assembly; and a track tensioner 284 that connects the square frame shaft and the drive housing. Although the following embodiments of the present invention are described in relation to a wheel assembly similar to that used on an ASV/Terex-RC/TP-50, such description is purely for illustrative purposes, and it is understood that embodiments of the present invention provide for the installation of continuous tracks on a variety wheel assemblies for a variety of heavy-equipment machines. For instance, embodiments of the present invention may also be implemented to remove and/or install a continuous track on a Caterpillar™ 247, a Caterpillar™ 257, an ASV/Terex-RC/PT-30, an ASV/Terex-RC/PT-60, or the like.

Figure 24:
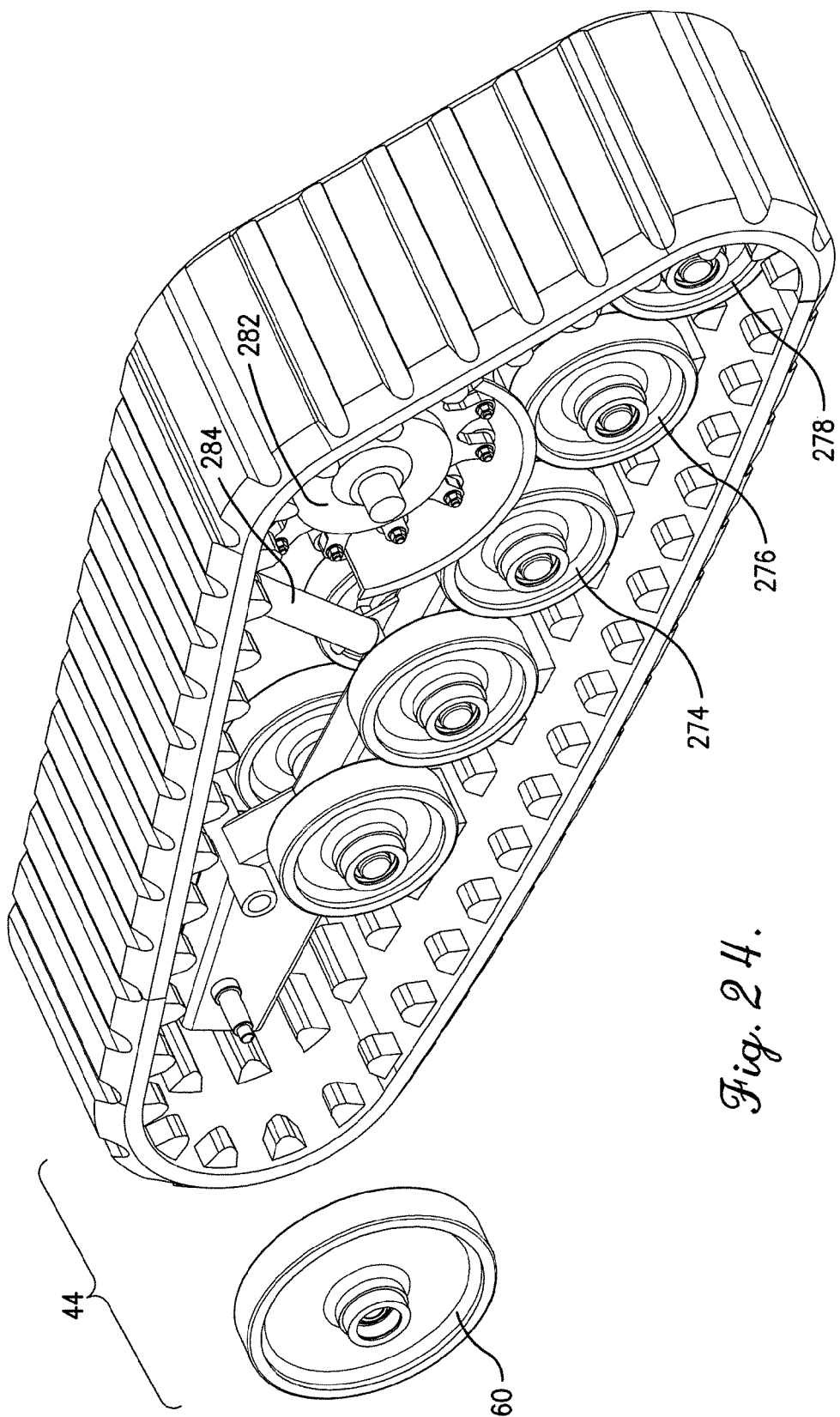
FIG. 24 is a proximal perspective view of the second wheel assembly shown in FIGS. 1 and 23, with a front exterior idler wheel removed from the second wheel assembly.

Before installation can begin, an original track must be removed from the second wheel assembly 44 of the second heavy-equipment machine. If the second heavy-equipment machine has a boom, the boom must be raised and placed in a locked position to make room for a working area. The second wheel assembly 44 of a side of the second heavy-equipment machine from which the original track is to be replaced must be raised approximately 6 inches off the ground by jack or lift that is commonly known in the art and that is sturdy enough to support the weight of the heavy-equipment machine. With reference to FIG. 24, the track tensioner 284 is disconnected from the drive housing 282 and is rotated away from the drive housing. After the track tensioner 284 is removed, the drive housing 282 may collapse down against or above the third and fourth bogie wheels 274,276. The front exterior idler wheel 60 may be unsecured from the shaft by removing a snap ring, dust cap, and retaining nut from a center of the idler wheel. Once the front exterior idler wheel has been unsecured, it may be removed from the second wheel assembly 44. Thereafter, a crow bar and a sledgehammer may be used to remove the old continuous track from the second wheel assembly 44.

Figure 25:
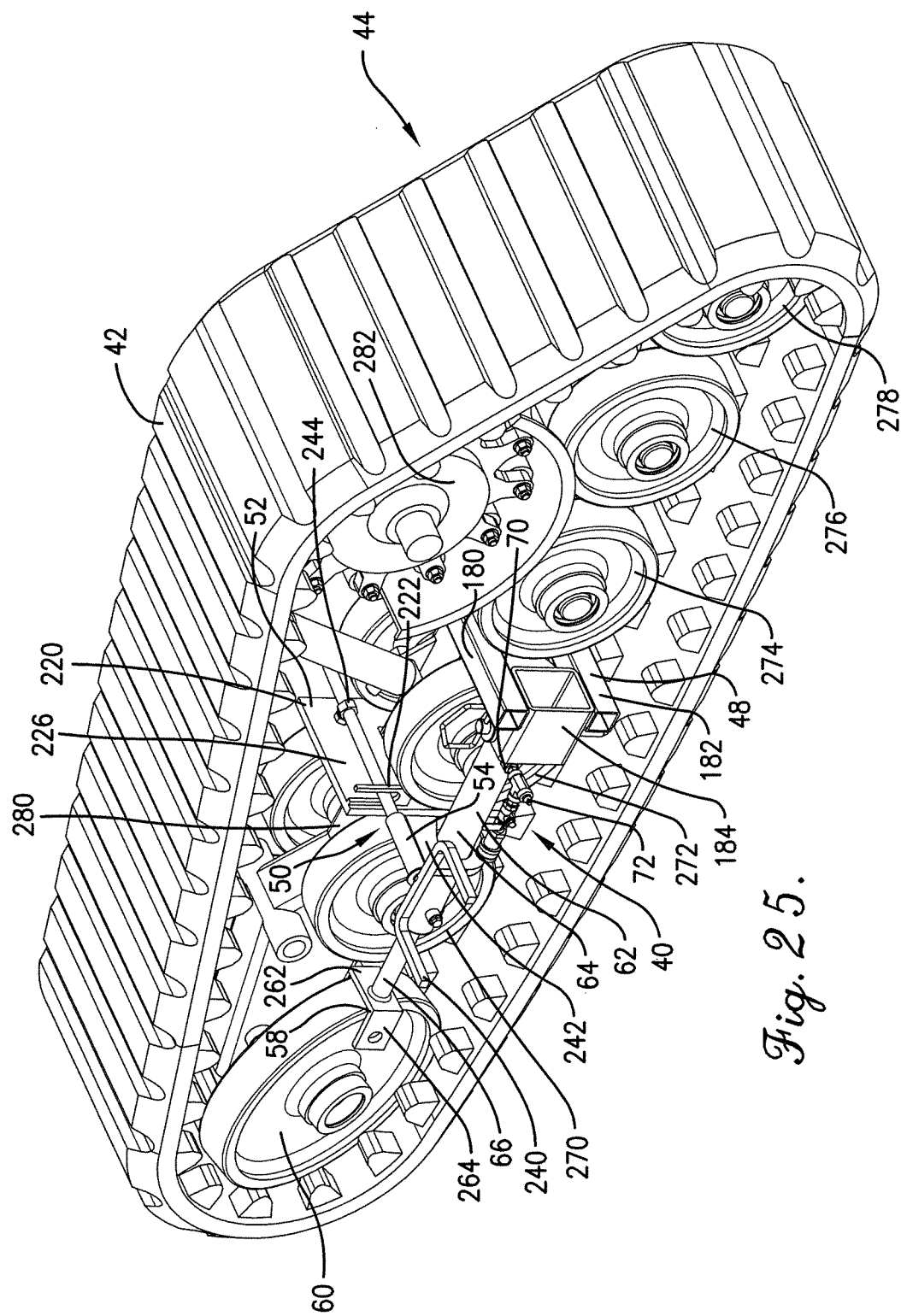
FIG. 25 is a proximal perspective view of the second wheel assembly shown in FIGS. 1 and 23-24, with the second system from FIG. 4 attached to re-align the front exterior idler wheel.
Figure 26:
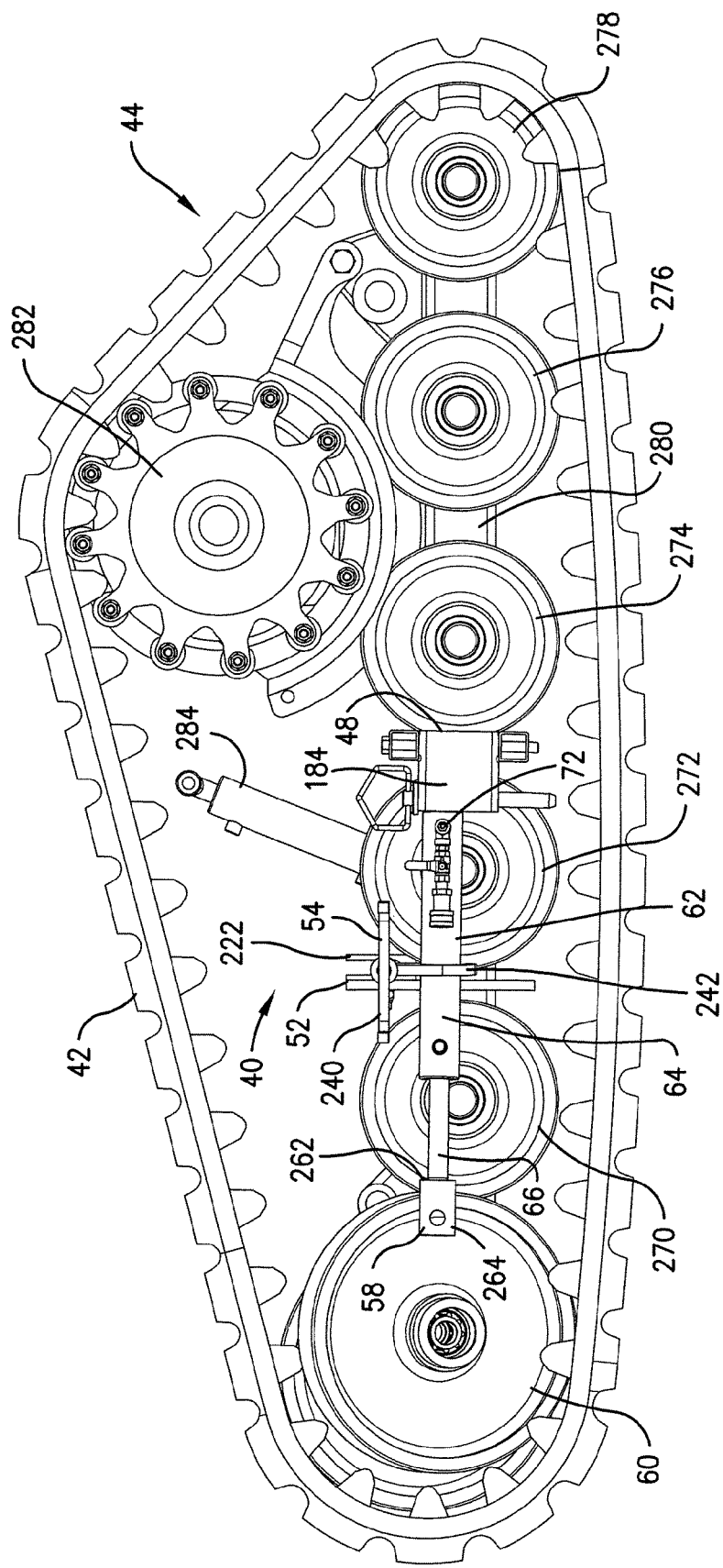
FIG. 26 is a perspective view of the second wheel assembly shown in FIGS. 1 and 23-25, with the second system from FIG. 4 attached to re-align the front exterior idler wheel.

A new continuous track may installed on the second wheel assembly 44 by first positioning the new continuous track over a back portion of the second wheel assembly 44, starting with the rear bogie wheels (i.e., fourth and fifth bogie wheels 276,278) and the drive housing 282. Once the new continuous track is installed over the back portion of the second wheel assembly 44, the new continuous track can be installed over a front portion. A crow bar may be required when installing the track over a front interior idler wheel positioned at the front portion of the second wheel assembly 44. After the new track is positioned on the second wheel assembly 44, the system 40 of embodiments of the present invention may be attached to the second wheel assembly, such as illustrated in FIGS. 25-26, and used to install the front exterior idler wheel 60 and to properly align the new continuous track 42 with the second wheel assembly.

The second base assembly 48 is positioned between the second and third bogie wheels 272,274 by fitting the interior ends of the top and bottom square pipes 180,182 around the square frame shaft 280. The second base assembly 48 is positioned such that the distal opening of the small rectangular pipe 184 is facing the front of the second wheel assembly 44. The second base assembly 48 is secured to the square frame shaft 280 by inserting a securing member through aligned circular openings 198 of the top and bottom square pipes 180,182.

The second extension assembly 46, which may include the hydraulic cylinder 62, is attached to the second base assembly by inserting the short pipe 68, located on the distal end of the hydraulic cylinder 62, into the proximal opening of the second base assembly's rectangular pipe 184. The short pipe 68 should be inserted such that the longitudinal axis of the short pipe is aligned with centers of the circular openings 210 on the rectangular pipe 184. The hydraulic cylinder 62 is secured to the second base assembly 48 by inserting a securing member through the circular openings 210 of the rectangular pipe 184 and the short pipe 68 of the hydraulic cylinder 62. For accessibility purposes, the hydraulic cylinder 62 should be positioned such that the first grease nipple 70 (and the valve assembly 72) is facing exteriorly away from the second wheel assembly 44.

The U-shaped saddle 52 of the second support assembly 50 may be positioned between the first and second bogie wheel 270,272 by placing the bottom edge 232 of the U-shaped saddle's main plate 220 over the square frame shaft 280 such that the bottom edge 232 is facing down. The U-shaped saddle 52 is positioned such that the proximal-facing surface 226 of the U-shaped main plate 220 is facing the rear of the second wheel assembly 44.

The jack-screw assembly 54 of the support assembly is attached to the U-shaped saddle 52 by first inserting the small bolt 258 of the bolt assembly 244 through the circular opening 224 in the U-shaped saddle's main plate 220. The bolt assembly 244 is secured to the U-shaped saddle 52 via the self-locking nut 260 that is threaded onto the small bolt 258. The bolt assembly 244 is positioned on the U-shaped main plate 220 such that the main nut 256 is positioned adjacent to the proximal-facing surface 228 of the U-shaped main plate. The interior end of the threaded rod 238 of the jack-screw assembly 54 is then threaded into the main nut 256 of the bolt assembly 244. After the threaded rod 238 has been threaded through the main nut 256, the jack-screw assembly 54 can be positioned such that an exterior portion of the threaded rod is resting in the u-shaped cutout of the U-shaped bracket 222 of the U-shaped saddle 52.

After the jack-screw assembly 54 has been attached to the U-shaped saddle 52, the jack-screw assembly's hook-shape body 242 can be positioned such that the hollow barrel 64 of the hydraulic cylinder 62 is received into the C-shaped cutout of the hook-shaped body. The threaded rod 238 of the jack-screw assembly 54 may be further threaded in or out through the bolt assembly 244, via manipulation of the U-shaped handle 240, such that the hook-shaped body 242 fully accepts the hollowed barrel 54 of the hydraulic cylinder 62.

In addition, the L-shaped bracket 58 of the second installation bracket assembly 56 may be attached to the piston rod 66 of the hydraulic cylinder 62. As previously described, the L-shaped bracket 58 may be connected to the piston rod 66 by weld or other suitable method of generally permanent attachment.

Figure 27:
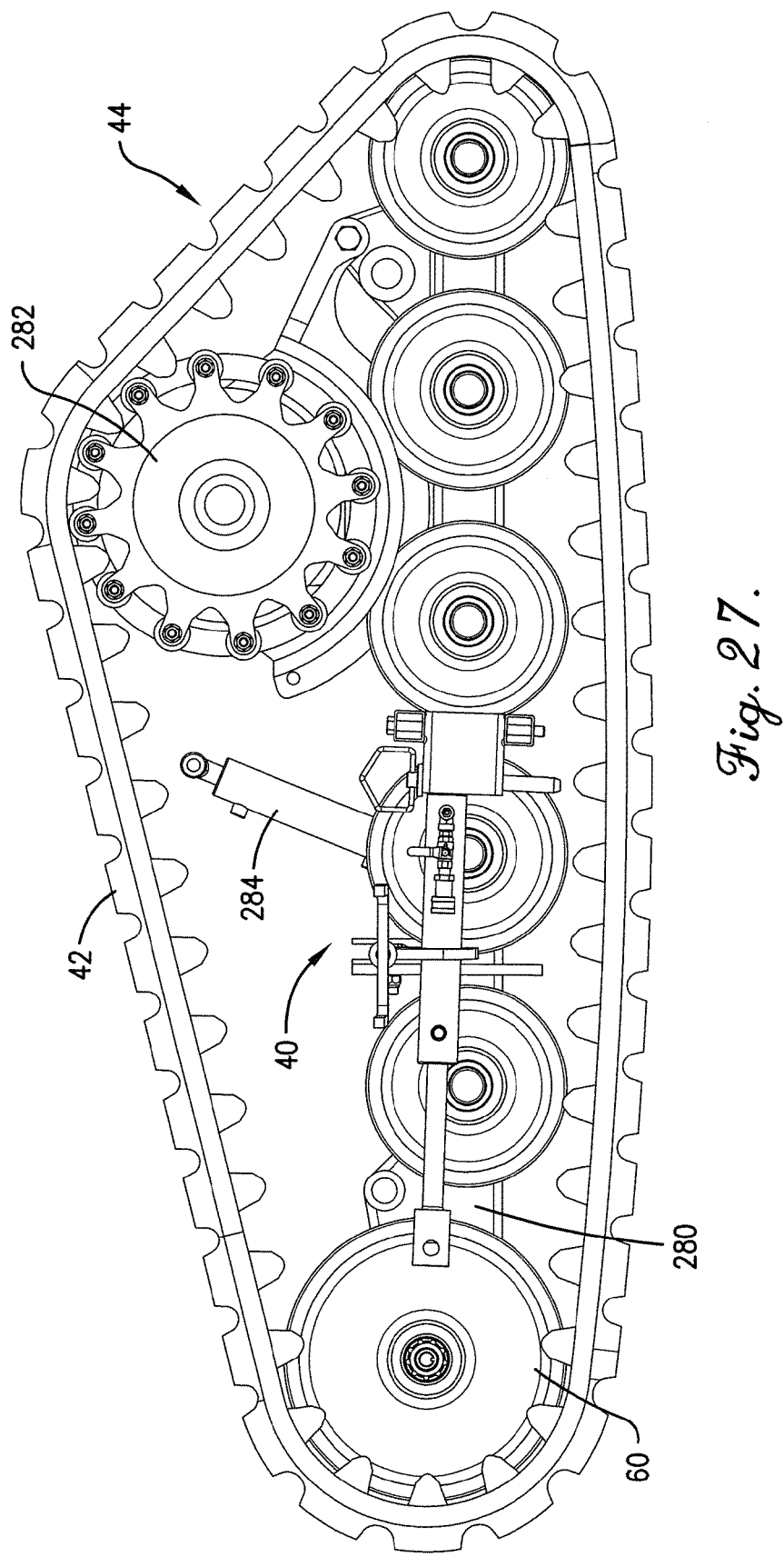
FIG. 27 is a perspective view of the first wheel assembly shown in FIGS. 1 and 23-26, with the second system from FIG. 4 attached and with the front exterior idler wheel properly aligned.

With the second system 40 fully assembled and attached to the second wheel assembly 44, the front exterior idler wheel 60 can be installed onto the second wheel assembly and the new continuous track can be properly positioned. The front exterior idler wheel 60 is placed between the new continuous track as near as possible to its intended, final position. The hydraulic cylinder 62 is stroked out by attaching a grease gun, or other hydraulic device, to the first grease nipple 70 and/or the valve assembly 72. The hydraulic cylinder 62 is stroked until the piston rod 66 has extended such that the proximal section 262 of the L-shaped bracket 58 makes contact with a circumferential edge of the idler wheel 60. The L-shaped bracket 58 should be rotated such that its side section 264 is positioned on an exterior side of the idler wheel 60. In such an arrangement, hydraulic cylinder 62 can be stroked, thus forcing the idler wheel 60 forward towards the front of the second wheel assembly 44. Simultaneously, the idler wheel 60 can be drawn toward the second wheel assembly 44 by manipulating the U-shaped handle 240 of the jack-screw 54 assembly, which operates to force the hydraulic cylinder 62, the second installation bracket 56, and the idler wheel 60 toward the second wheel assembly 44. By alternating stroking the hydraulic cylinder 62 and manipulating the jack-screw assembly 54, the idler wheel 60 can be forced flush against the square frame shaft 280 and extended until the idler wheel's axis is aligned with a bore on the square frame shaft, such as illustrated in FIG. 27. Thereafter, the idler wheel 60 can be re-secured the square frame shaft 280 of the second wheel assembly 44 by replacing the idler wheel's snap ring, dust cap, and retaining nut. Once the idler wheel 60 has been properly re-secured, the new continuous track will generally be properly positioned onto the second wheel assembly 44. In some instances, however, a block and sledge hammer may be required to force the new continuous track completely over the front idler wheels of the second wheel assembly 44.

Although this invention has been described with its preferred embodiment(s), it is noted that equivalents may be employed and substitutions made herein without departing from the scope of the invention. For example, although embodiments of the present invention were described with reference to installation of a track on an ASV/Terex-RC/TP-50, it is understood that such description was simply for descriptive purposes, and that embodiments the present invention may be used to install continuous tracks on a variety wheel assemblies for a variety of heavy-equipment machines.

The invention claimed is:

1. A method of replacing an original continuous track on a wheel assembly of a heavy-equipment machine, the method comprising the following steps:
   acquiring a track installation device configured for being selectively attached to the wheel assembly;
   lifting a first side of the heavy-equipment machine;
   releasing a track tensioner from the wheel assembly;
   attaching the track installation device to the wheel assembly;

relieving tension on the original continuous track by operating an actuator of the track installation device;

removing the original continuous track from the wheel assembly;

installing a new continuous track to the wheel assembly;

applying tension on the new continuous track by operating the actuator;

removing the track installation device from the wheel assembly;

installing the track tensioner of the wheel assembly; and lowering the first side of the heavy-equipment machine.

2. The method of claim 1, wherein the track installation device is configured to be removed before the heavy-equipment machine resumes mobile operations.

3. The method of claim 1, wherein the wheel assembly comprises a plurality of wheels.

4. The method of claim 1, wherein the step of attaching the track installation device includes securing a base assembly of the track installation device to a first location of the wheel assembly.

5. The method of claim 4, wherein the first location is gap in a wheel support shaft of the wheel assembly.

6. The method of claim 5, wherein the base assembly is secured by placing a saddle of the base assembly into said gap in the wheel support shaft and securing a lock plate to the saddle.

7. The method of claim 1, wherein the step of attaching the track installation device includes securing an extension assembly to a second location of the wheel assembly.

8. The method of claim 7, wherein the step of relieving tension on the original continuous track is performed by applying a source of hydraulic pressure to the extension assembly of the track installation device.

9. The method of claim 1, wherein the step of removing the original continuous track includes removing a drive support assembly from the wheel assembly.

10. A method of instructing replacement of a continuous track on a wheel assembly of a heavy-equipment machine, the method comprising the following steps:

providing a track installation device configured for being selectively attached to the wheel assembly;

providing a set of instructions for a user to utilize in replacing the continuous track, the set of instructions requesting that the user perform the following steps:

lifting a first side of the heavy-equipment machine;

releasing a track tensioner from the wheel assembly;

attaching the track installation device to the wheel assembly;

relieving tension on the original continuous track by operating an actuator of the track installation device;

removing the original continuous track from the wheel assembly;

installing a new continuous track to the wheel assembly;

applying tension on the new continuous track by operating the actuator;

removing the track installation device from the wheel assembly;

installing the track tensioner of the wheel assembly; and lowering the first side of the heavy-equipment machine.

11. The method of claim 10, wherein the track installation device is configured to be removed before the heavy-equipment machine resumes mobile operations.

12. The method of claim 10, wherein the wheel assembly comprises a plurality of wheels.

13. The method of claim 10, wherein the step of attaching the track installation device includes securing a base assembly of the track installation device to a first location of the wheel assembly.

14. The method of claim 13, wherein the first location is gap in a wheel support shaft of the wheel assembly.

15. The method of claim 14, wherein the base assembly is secured by placing a saddle of the base assembly into said gap in the wheel support shaft and securing a lock plate to the saddle.

16. The method of claim 10, wherein the step of attaching the track installation device includes securing an extension assembly to a second location of the wheel assembly.

17. The method of claim 16, wherein the step of relieving tension on the original continuous track is performed by applying a source of hydraulic pressure to the extension assembly of the track installation device.

18. The method of claim 10, wherein the step of removing the original continuous track includes removing a drive support assembly from the wheel assembly.

* * * * *